United States Patent
Metcalfe

(10) Patent No.: US 6,449,061 B2
(45) Date of Patent: *Sep. 10, 2002

(54) SYSTEM AND METHOD FOR PROVIDING DYNAMIC NOISE PROFILE SELECTION FOR HYBRID AND ERROR DIFFUSION IMAGE PROCESSING

(75) Inventor: David J. Metcalfe, Marion, NY (US)

(73) Assignee: Xerox Corporation, Stamford, CT (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/062,404

(22) Filed: Apr. 20, 1998

Related U.S. Application Data

(60) Provisional application No. 60/059,758, filed on Sep. 23, 1997.

(51) Int. Cl.[7] ............... G06K 15/02; H04N 1/409

(52) U.S. Cl. .................... 358/3.05; 358/3.26

(58) Field of Search ................. 382/252, 173, 382/254, 275, 170; 358/455, 456, 1.9, 3.03, 3.05, 3.26

(56) References Cited

U.S. PATENT DOCUMENTS

| | | | |
|---|---|---|---|
| 4,654,721 A | * | 3/1987 | Goertzel et al. ............ 358/456 |
| 5,121,447 A | * | 6/1992 | Tanioka et al. ............ 382/275 |
| 5,608,821 A | * | 3/1997 | Metcalfe et al. ............ 358/455 |
| 5,809,177 A | * | 9/1998 | Metcalfe et al. ............ 382/252 |

FOREIGN PATENT DOCUMENTS

| | | | |
|---|---|---|---|
| EP | 0 696 129 | 2/1996 | |
| EP | 0 696 130 | 2/1996 | |
| EP | 0 715 451 | 6/1996 | |
| EP | 0 781 034 | 6/1997 | |
| JP | 57-060772 | * 4/1982 | ............ H04N/1/40 |

OTHER PUBLICATIONS

Masayuki Yoshida et al.: "Bi–level Rendition of Images Containing Text, Screened Halftone and Continuous Tone", Proceedings of the Global Telecommunications Conference. (GLOBECOM), US, New York, IEE, vol. 1, 1991, pp. 104–109, XP000325957 isbn: 0–87942–697–7.

* cited by examiner

*Primary Examiner*—Scott Rogers
(74) *Attorney, Agent, or Firm*—Michael J. Nickerson; William Eipert

(57) ABSTRACT

A process eliminates pattern shifting artifacts in a printed image rendered using a hybrid high addressable error diffusion process by perturbing a threshold/image signal value relationship when a multi-level grey level is binarized. The process utilizes a programmable multi-level grey signal modifying circuit for modifying the multi-level grey signal by a predetermined value according to its grey level. The modified multi-level grey signal is binarized to a binary pixel signal according to a relationship between the modified multi-level grey signal and a threshold value. The process further generates an error corresponding to the relationship and diffuses the error to neighboring pixels. The multi-level grey signal is modified with either random noise multiplied by a grey level dependent coefficient value. The coefficient value is dependent upon an image classification of the pixel being processed.

12 Claims, 19 Drawing Sheets

| 64 | 192 | 128 | 64 | 192 | 128 | 64 | 192 | 128 |
|----|-----|-----|----|-----|-----|----|-----|-----|
| 64 | 192 | 128 | 64 | 192 | 128 | 64 | 192 | 128 |
| 64 | 192 | 128 | 64 | 192 | 128 | 64 | 192 | 128 |
| 64 | 192 | 128 | 64 | 192 | 128 | 64 | 192 | 128 |

| 64 | 192 | 128 | 64 | 192 | 128 | 64 |
|-----|-----|-----|-----|-----|-----|-----|
| 128 | 64 | 192 | 128 | 64 | 192 | 128 |
| 192 | 128 | 64 | 192 | 128 | 64 | 192 |
| 64 | 192 | 128 | 64 | 192 | 128 | 64 |

SYSTEM AND METHOD FOR PROVIDING DYNAMIC NOISE PROFILE SELECTION FOR HYBRID AND ERROR DIFFUSION IMAGE PROCESSING

This patent application claims priority under 35 U.S.C. §119 to provisional patent application No. 60/059,758, filed on Sep. 23, 1997.

FIELD OF THE PRESENT INVENTION

The present invention is directed to a system and method for reducing hybrid error diffusion pattern shifting at certain grey levels and is dependent upon the image processing operations associated with the pixel being processed. More specifically, the present invention is directed to providing a dynamic noise profile to reduce hybrid error diffusion pattern shifting at certain grey levels by perturbing the threshold value used to binarize the image data wherein the noise profile is selected based on a window effect pointer or image classification of the pixel being processed and/or the grey level of the pixel being processed.

BACKGROUND OF THE PRESENT INVENTION

There are many methods of rendering grey images on an output device. One such example is error diffusion. Error diffusion can render complex images that contain a mixture of text and picture reasonably well. The utilization of error diffusion eliminates the need to have image segmentation to separate the text from the picture so that the picture aspect of the document can be screened and the text aspect of the document can be threshold.

FIG. 1 illustrates a flowchart of a typical error diffusion binarization system. In Step S1 of this process, the video signal for pixel X is modified to include the accumulated error diffused to this pixel from previous threshold processes. The modified video signal value X is compared at Step S2 with the value 128, assuming a video range between 0 and 255. If Step S2 determines that the modified video signal value X is greater than or equal to 128, the process proceeds to Step S4 wherein a value is output to indicate the turning ON of pixel X. The process then proceeds to calculate the error associated with the threshold process at Step S6 wherein this error, Y, is calculate as being X−255.

On the other hand, if Step S2 determines that the modified video signal value X is less than 128, a signal is output at Step S3 indicating that the pixel X is to be turned OFF. The process then proceeds to Step S5 wherein the error, Y, is calculated as being equal to the value X.

The error calculated in either Steps S5 or S6 is multiplied by weighting coefficients and distributed to downstream pixels in Step S7. Thus, the error from the threshold process is diffused to adjacent pixels. The coefficients conventionally used to diffuse the error to adjacent downstream pixels.

In addition to the typical error diffusion described above, hybrid high addressability error diffusion process can also be utilized which will be explained briefly.

Typically, the image processing architecture of a printing system uses either the functions of screening, thresholding, or error diffusion. For pixels to be screened, a similar modified video signal, $V_S'$, is computed from the pixel video signal V and the screen value S at the pixel location. The modified video signal, $V_S'$, for a conventional screening process is defined as $V_S'=(S+255-V)/2$ in a system having 256 grey levels. The screen value S depends on the pixel location as well as the halftone screening pattern being used. It is noted that either a line screen or a dot screen can be used.

In the final step of binarization, the modified video signal, $V_S'$, is compared with 128 to determine the ON or OFF characteristics of the pixel. Namely, if the modified video signal is greater than or equal to 128, the pixel should be OFF (black), otherwise it should be ON (white). FIG. 2 illustrates a typical circuit for carrying the screening process wherein a screen value is added to the video signal by modulator 1 and comparator 3 compares the modified video signal with the threshold value. It is noted that this example gives the same result as the more typical approach of comparing the video V itself with a screen in lieu of the threshold value.

Hybrid error diffusion is the intertwining of the typical screening process with conventional error diffusion. Moreover, the typical error diffusion process can be extended to a high addressability environment. The blending of these three process will be discussed in more detail below.

To extend the conventional error diffusion process, described above, to a hybrid high addressability environment, the binarization (threshold) is performed at a higher spatial resolution, but the error computation and propagation is performed at the original lower spatial resolution. This splitting of the process substantially prevents or reduces the number of isolated subpixels, thereby maintaining high image quality.

In explaining the hybrid high addressability error diffusion process, it is assumed that the input grey levels at pixel location i and pixel location i+1 are represented by $V_i$ and $V_{i+1}$, respectively, wherein $V_i'=(G_L-V_i)+(S_i-Th)$, and $V_{i+1}'=(G_L-V_{i+1})+(Si_{i+1}-Th)$ wherein $G_L$ is the maximum grey level a pixel can have, $S_i$ and $S_{i+1}$ are the screen values for the pixels based on position of the pixels, and Th is the threshold value. The rendering error, at the lower resolution, that passes from upstream pixels to the downstream pixel location is denoted by $e_i$.

It is noted that a feature of high addressability involves interpolation between pixels, the creation of subpixels. This interpolation impacts the hybrid high addressability error diffusion process. More specifically, depending on the way the interpolation is done, two distinct outputs can be obtained utilizing the high addressability error diffusion process. Each one of these distinct outputs will be discussed below.

With respect to a first interpolation scheme, the steps for determining the printing or rendering of a subpixel are as follows.

Initially, the modified pixel values $P0_i=V_i+e_i$ and $P1_i=V_{i+1}+e_i$ are computed wherein $V_i'=(G_L-V_i)+(S_i-Th)$, and $V_{i+1}'=(G_L-V_{i+1})+(S_{i+1}-Th)$. The subpixels are denoted by 0 to N−1 wherein the high addressability characteristic is N. The high addressability characteristics is the number of subpixels that a printer can produce compared to the throughput bandwidth of the image processing system. In other words, the high addressability characteristic defined as the number of subpixels that the image output terminal can render from one pixel of image data.

High addressability is important in situations where the device can process the image data at one resolution, but print at a higher resolution. In such a situation, the present invention can take advantage of a processing system designed for a lower resolution image, (lower resolution can be processed quicker and less expensively), and a printing device which, through laser pulse manipulation, can print at a higher resolution. For example, the image can be processed at 600×600×8 and printed at 2400×600×1 using the high addressability process. In the above example, the high addressability characteristic is 4. If the image was processed at 600×600×8 and printed at 1200×600×1, the high addressability characteristic would be 2.

The interpolated subpixel values are computed as $B_n=P0+n(P1-P0)/N$ for n=0 to N−1. The interpolated subpixel values are then compared with a threshold value which in most cases is 128, assuming that the video value ranges from 0 to 255 ($G_L$ is equal to 255). If $B_n$ is greater than or equal to 128, the subpixel is turned ON; otherwise, the subpixel is turned OFF. The error to be propagated to downstream pixels is computed as the desired output, (P0+P1)/2, minus the actual output, namely, y*255/N, wherein y is the number of subpixels turned ON. The error is then multiplied by a set of weighting coefficients and distributed to the downstream pixels as in the first version.

More specifically, the screened inputted modified video signal is divided into N subpixel units. The P0 and P1 values are computed as noted above. The computed subpixel values are compared with a threshold value, namely 128. If the subpixel value is greater than or equal to the threshold value, the subpixel value is set to the ON state. However, if the subpixel value is less than 128, the subpixel value is set to the OFF state.

Upon completing the comparison of all subpixel values, the number of ON subpixels are calculated. Moreover, the error from the threshold process is calculated so that the value represents the original lower spatial resolution. Upon calculating the error, the error is multiplied by weighting coefficients and distributed the error to downstream pixels.

As noted above, the modified pixel values $P0_i=V_{i-1}+e_{i-1}=P1_{i-1}$ and $P1_i=V_i+e_i$ are computed at two locations corresponding to the input resolution wherein $V_i=(G_L-V_i)+(S_i-Th)$ and $V_{i-1}=(G_L-V_{i-1})+(S_{i-1}Th)$. An example of this is illustrated in FIG. 17 wherein the subpixels are denoted by 0 to N−1. In FIG. 17, the high addressability characteristic, N, is equal to 4.

As illustrated in FIG. 16, a line is drawn to connect the values P0 and P1. (The i subscripts have been dropped for simplicity.) Moreover, a dotted line is drawn to represent a threshold value of 128. (Again, it is noted that 0 to 255 is the range of the video signal; however, any range can be utilized and any threshold value may be used.) The intersection of the line connecting P0 and P1 and the line representing the threshold at 128 determines which subpixels are to be rendered or printed. The X coordinate of the point of intersection is determined and normalized to N by the equation $X=N(128-P0)/(P1-P0)$.

Next, it is determined which subpixels are to be turned ON. If X is less than or equal to 0 and if P1 is greater than or equal to 128, all the subpixels are ON; otherwise, all the subpixels are OFF. This decision represents the complete rendering or non-rendering of the pixel. To determine a partial rendering of the whole pixel, a subpixel analysis must be performed. In this instance, the value X must be compared to the individual subpixel values.

It is noted, as illustrated in FIG. 16, that the value of X does not necessarily compute to a whole number or subpixel, thereby making any analysis include a fractional component. To avoid this, X is converted to a whole number or subpixel value as illustrated in FIG. 17. For this conversion, n is allowed to be equal to the truncated integer value of X. The values n and X can then be utilized to determine which subpixels are to be turned ON and which subpixels are to be turned OFF. More specifically, if X is greater than 0, but less than n, and if P1 is less than 128, only the subpixels from 0 to n are turned ON and the rest of the subpixels are turned OFF; otherwise, the subpixels from 0 to n are turned OFF and the rest are turned ON. If X is greater than or equal to n and if P0 is greater than or equal to 128, all subpixels are turned ON; otherwise, all subpixels are turned OFF.

This threshold process produces an error which needs to be propagated to downstream pixels. Moreover, as noted above, the error needs to be at the original low resolution input. The conversion to the original resolution is realized by determining the difference between the desired output, (P0+P1)/2, and the actual output, namely b*255/N where b is the number of subpixels that were turned ON. The converted error is then multiplied by a set of weighting coefficients and distributed to the downstream pixels.

The second interpolation method, with respect to implementing the hybrid high addressability error diffusion method, is the same as the first implementation except the modified pixel values in the second implementation are calculated as follows $P0_i=V_i+e_i$ and $P1_i=V_{i+1}+e_i$ wherein $V_i=(G_L-V_i)+(S_i-Th)$ and $V_{i-1}=(G_L-V_{i-1})+(S_{i-1}-Th)$. The difference in the implementations can be seen in FIGS. 18 and 19.

FIG. 18 illustrates the high addressability relationship between adjacent pixels utilizing the first interpolation version of high addressability error diffusion method. More specifically, it is noted that the P1 value of the present pixel is utilized as the P0 value for the next pixel.

On the other hand, FIG. 19 illustrates the high addressability relationship between pixels utilizing the second interpolation version of the high addressability error diffusion method. In this case, there is discontinuity between the P1 value of the previous pixel and the P0 value of the present pixel. Thus, from these two Figures, it can be seen that the error output from the two versions of the hybrid high addressability error diffusion methods will be different.

One problem associated with the utilization of a typical error diffusion process or a hybrid high addressable error diffusion process in rendering an image on a document is the occurrence of periodically repeating patterns. These patterns occur most notably at the grey levels of 85, 128, and 170 when an 8 bit data word is utilized to represent the grey level of the image data. For example, when the grey level input is 128, the binarized image can alternate between a checkerboard pattern and a vertical line pattern. Depending on the printer spot size and the grey level at which the spot was mapped, the vertical line pattern can appear lighter than the checkered board pattern, thereby producing a undesired artifact.

The idea of dithering or adding threshold perturbations to defeat visual artifacts of a regular and deterministic nature has been utilized in the prior art. For example, in the article "Digital Halftoning" by Robert Ulichney, it was proposed to add random noise, across the entire image, to the elements of the error weights or to the threshold to defeat the visual artifacts discussed above. However, by adding noise to all parts of an image tends to degrade the image and will also destroy the dot pattern established in the highlight and shadow areas.

Therefore, it is desirable to perturb only the threshold in those areas where the occurrence of periodically repeating patterns are distracting. More specifically, it is desirable to eliminate pattern shifting artifacts by making one of the patterns much less likely to occur. On the other hand, it is desirable to mask this artifact by making the transitions between the patterns happen more frequently, thereby breaking up the regular patterns.

SUMMARY OF THE PRESENT INVENTION

A first aspect of the present invention is a system for reducing a number of levels in a multi-level grey scale pixel value representing a pixel and diffusing an error generated from reducing the number of levels. The system includes means for receiving a multi-level grey scale pixel value representing a pixel having a first resolution. Reduction means reduces the number of levels in the multi-level grey scale pixel value; error means generates an error value as a result of the reduction process by said reduction means; and diffusing means diffuses the error value to multi-level grey scale pixel values of adjacent pixels. Perturbing means perturbs the relationship between the threshold value and the multi-level grey signal according to an image classification of the multi-level grey signal, thereby effecting the output from the conversion means.

A second aspect of the present invention is a method of reducing a number of levels in a multi-level grey scale pixel value representing a pixel and diffusing an error generated from reducing the number of levels. The method receives a multi-level grey scale pixel value representing a pixel having a first resolution. The number of levels in the multi-level grey scale pixel value are reduced, generating an error value which is diffused to multi-level grey scale pixel values of adjacent pixels. The relationship between the threshold value and the multi-level grey signal is perturbed according to an image classification of the multi-level grey signal, thereby effecting the output.

Further objects and advantages of the present invention will become apparent from the following descriptions of the various embodiments and characteristic features of the present invention.

BRIEF DESCRIPTION OF THE DRAWINGS

The following is a brief description of each drawing used to describe the present invention, and thus, are being presented for illustrative purpose only and should not be limitative of the scope of the present invention wherein.

DESCRIPTION OF THE PRESENT INVENTION

Figure 1:
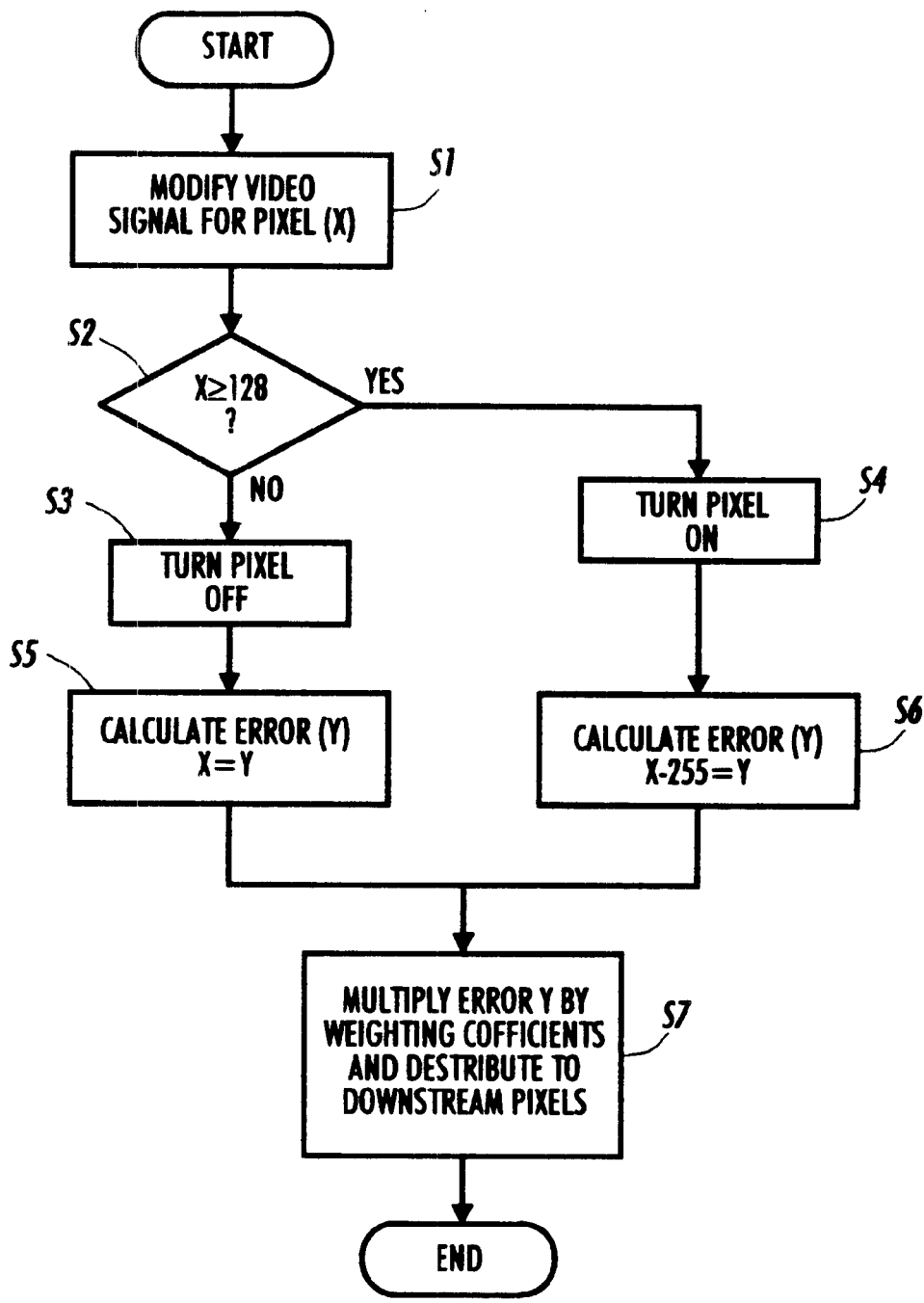
FIG. 1 shows a flowchart illustrating a typical error diffusion process.
Figure 2:
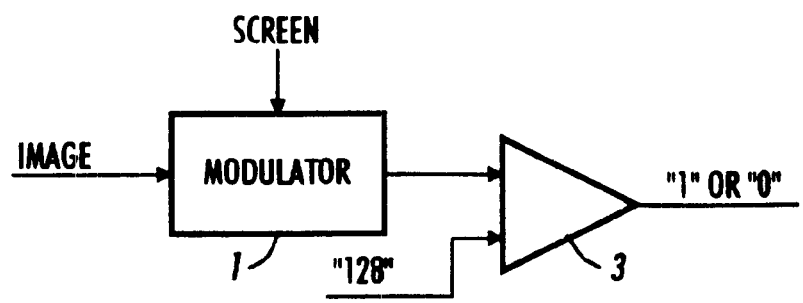
FIG. 2 is a block diagram of a conventional screening circuit.

The following will be a detailed description of the drawings illustrating the present invention. In this description, as well as in the drawings, like reference numerals represent the devices, circuits, or circuits performing the same or equivalent functions.

Figure 3:
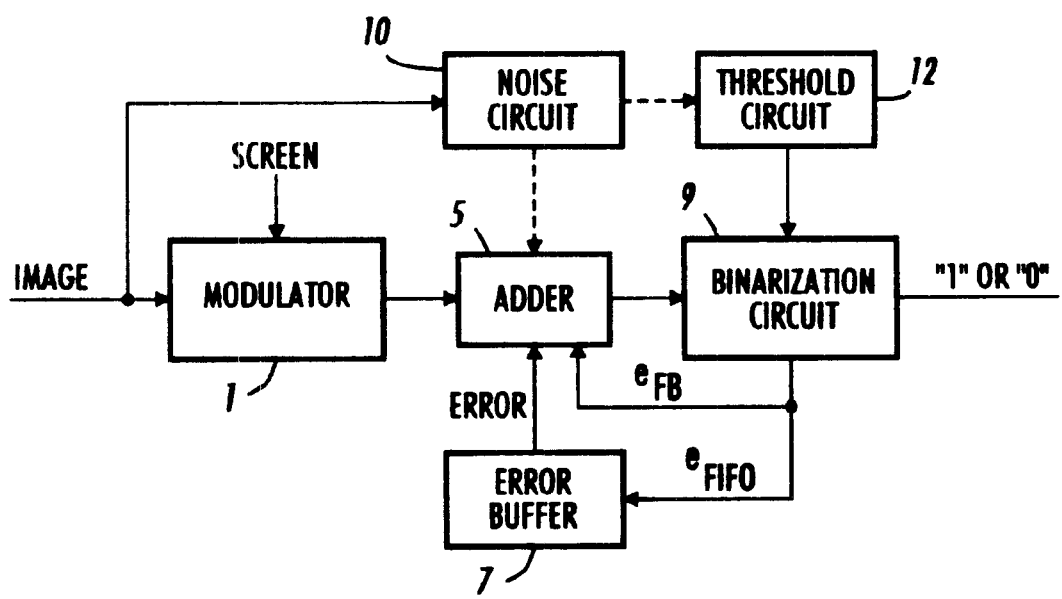
FIG. 3 shows a block diagram illustrating a conventional embodiment which perturbs the threshold by adding random noise.

FIG. 3 illustrates one embodiment which perturbs a threshold relationship between a modified video image signal and a threshold signal by adding either a random noise to a hybrid high addressable error diffusion modified video, a threshold signal in the hybrid high addressable error diffusion binarization system, a video signal, or a error signal being used to modified the video signal.

In FIG. 3, a circuit performs a screening/error diffusion process on an eight-bit image value. As shown, an unmodified video or image signal is screened by modulator 1 to produce a modified signal $V_S'$ using the preferred equation of $V_S'=(G_L-V_i)+(S_i-Th)$ wherein $S_i$ is equal to screen values derived from a halftone screen pattern, $V_i$ is the grey input video, $G_L$ is a maximum grey level value for a pixel in the system, and Th is the threshold value used in the binarization process.

This modified signal $V_S'$ is fed into adder 5 where the signal is further modified by the addition of an error value propagated from upstream processed pixel locations to produce $V_S''$ ($V_S''=V_S'+e_i$). The error component ($e_{FIFO}+e_{FB}$) utilized by adder 5 is received from error buffer 7 ($e_{FIFO}$) which stores the propagated error and binarization circuit 9 ($e_{FB}$).

The further modified signal $V_S''$ is fed into binarization circuit 9 which converts the multi-level modified signal $V_S''$ to a binary output by utilizing an error diffusion/threshold process. Some of the error ($e_{FB}$) from this process is fed back directly to the next to be processed pixel, while the rest ($e_{FIFO}$) is stored in the error buffer 7 for processing of pixels in the next scanline. The apportionment of the error is based on weighting coefficients. Any set of coefficients can be used. In a preferred embodiment, the weighting coefficients are the coefficients described in U.S. Pat. No. 5,353,127. The entire contents of U.S. Pat. No. 5,353,127 are hereby incorporated by reference.

Figures 6, 7, 8:
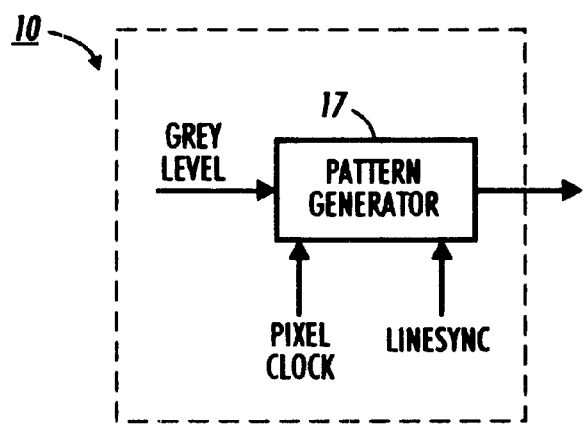
FIG. 6 shows a graphic representation illustrating a vertical line screen pattern.
FIG. 7 shows a graphical representation illustrating a diagonal line screen pattern.
FIG. 8 shows a block diagram illustrating a conventional embodiment which perturbs the threshold/signal by generating a predetermined pattern.

In this binarization process, the error that is produced represents the difference between the desired output, the multi-level image data value, and the actual output value which is either 255 or 0 if the multi-level of the image data is represented by 8 bits. This error is diffused, thereby retaining as much grey level information as possible. The combined screening and high addressability error diffusion rendering can be utilized using a simple vertical line screen pattern as illustrated in FIG. 6. Moreover, the process can be utilized with a 45° line screen as illustrated in FIG. 7. The process can also be utilized with a dot screen or a constant screen. In a preferred embodiment, a dot screen is utilized in a continuous tone region and a constant screen is used in a text region to emulate a simple error diffusion process. This creates smoother transitions from window-to-window or from effect-to-effect since the error stored in the buffer will be within the same range for both continuous tone and text regions.

Figure 4:
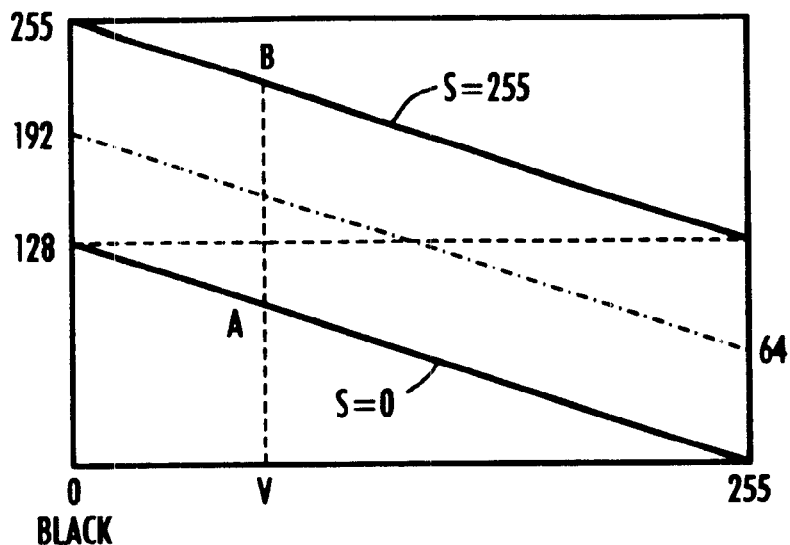
FIG. 4 shows a graphic representation of a typical screening process.

The conversion from the pixel video signal V to the screen modulated signal $V_S'$ is depicted in FIG. 4. For a fixed video signal V, the screen modulated video signal $V_S'$ has values varying between the levels A and B as the screen value S vary between 0 and 255. Thus, the effective white and black values to be used in the error diffusion process or calculation should be, in this example, for the value of white, 64 and, for the value of black, 192. This is different from the typical error diffusion values, where the white value would be V'=0 and the black value would be V'=255.

Figure 5:
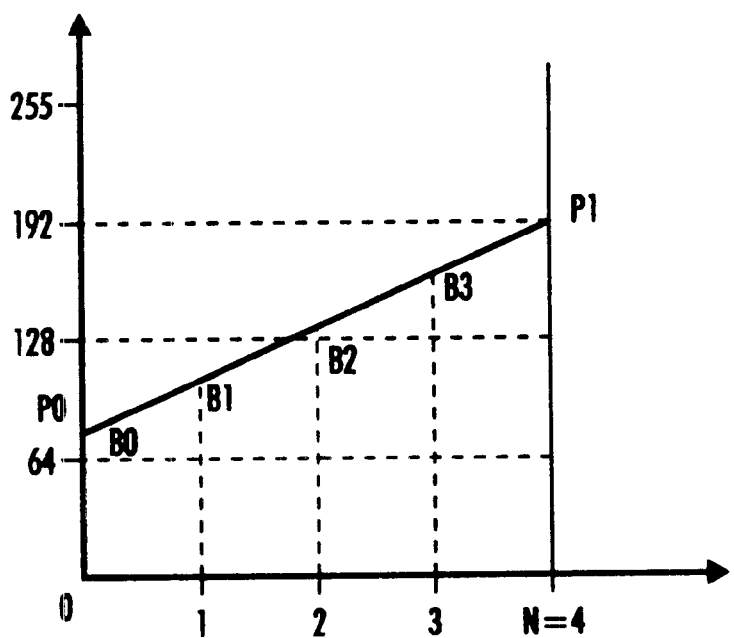
FIG. 5 shows a graphical representation illustrating interpolation and binarization processes.

The high addressability error diffusion process used in conjunction with the screening process will be further explained in conjunction with FIG. 5. In this explanation, the value $e_i$ represents the rendering error propagated to the present i-th pixel from the previous pixels. At the i-th pixel location, the subpixel values are given by $P0=V_{S\,i}'+e_i=V_{S\,i}''$ and $P1=V_{S\,i+1}'+e_i=V_{S\,i+1}''$. The values are used to obtain the interpolated values $B_0$ to $B_{N-1}$, as shown in FIG. 5. It is noted that the high addressability factor illustrated in FIG. 5 is N=4.

These interpolated values are then compared with 128 to determine the ON or OFF characteristics of the subpixels. If the number of subpixels rendered as black is indicated by n, the current rendering error is given by the desired output minus the actual output, $e_i'=((P0+P1)/2)-64-(n(192-64)/N)$. In other words, the actual output is defined as the desired output, $(P0+P1)/2)-64$, minus the product of the number of ON subpixels and the difference between the black and white reference values divided by the high addressability characteristic. This new error is then multiplied by a set of weighting coefficients and the weighted errors are propagated to the downstream pixels.

Moreover, FIG. 3 illustrates a noise circuit 10 which generates noise to be either fed to the adder 5 so as to modified the video signal or fed to a threshold circuit, which generates the threshold value for the binarization process carried out by binarization circuit 9, so as to modify the threshold value. A more detail illustration of the noise generator circuit 10 can be seen in FIG. 9.

Figure 9:
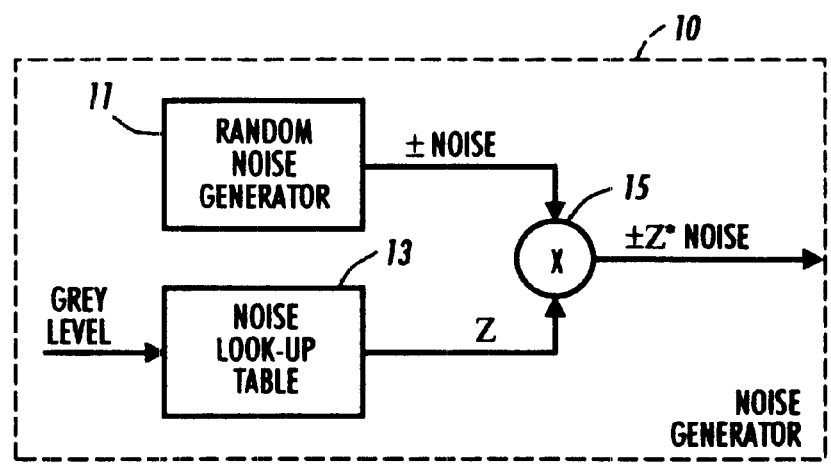
FIG. 9 shows a block diagram illustrating a noise generator utilized in a conventional embodiment.

FIG. 9 illustrates a random noise generator as utilized in the preferred embodiment. The random noise generator circuit 10 includes a random noise generator 11 which produces a random noise signal which is fed to a multiplier 15. In a preferred embodiment, the random number generated by the random noise generator 11 is uniformly distributed between plus or minus 255 with a period of over 14 million.

The noise generator circuit 5 also includes a noise look-up table 13 which outputs a coefficient corresponding to the grey level information received by the look-up table. The look-up table 13 programs or tailors the amplitude of the random noise added to the threshold or image signal as a function of the input grey level. The noise look-up table 13 holds N-bit fraction numbers, coefficients, (as a function of input grey levels) which are multiplied with the random noise (number) generated by the random noise generator 11 and later added to either the threshold or image signal value. Any noise profile can be loaded into the look-up table to selectively vary the location and magnitude of the threshold permutation in order to disrupt the periodicity of any objectionable pattern.

Figure 15:
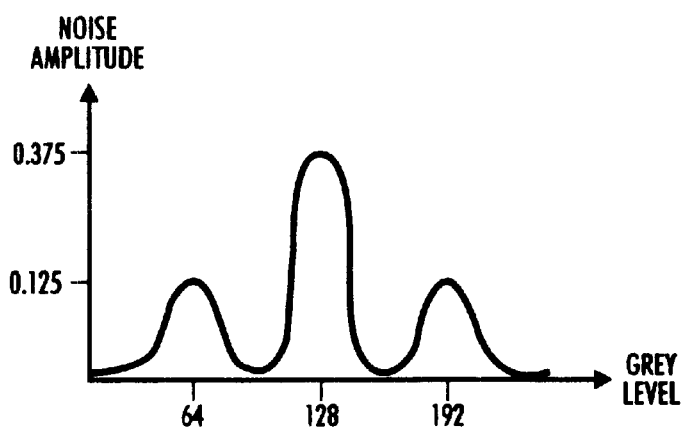
FIG. 15 illustrates a graph showing a preferred relationship between the noise amplitude coefficients and the grey level values of the video signal.
Figure 16:
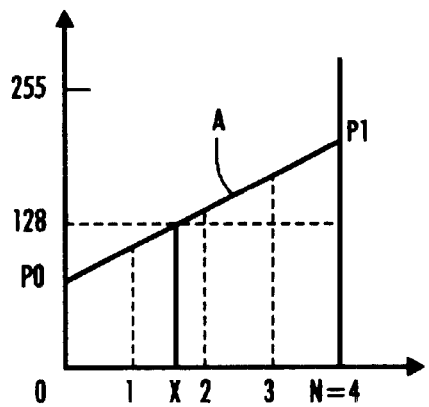
FIGS. 16 and 17 show graphs illustrating subpixel interpolation.
Figure 17:
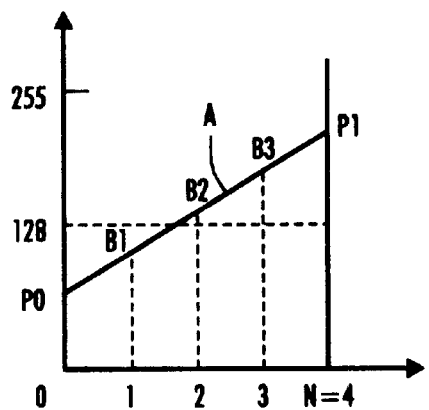
Figure 18:
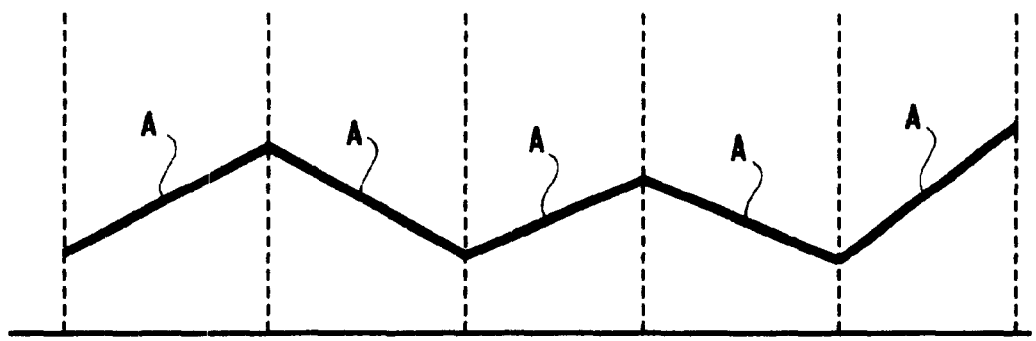
FIGS. 18 and 19 show graphs illustrating the subpixel relationships for the two interpolation schemes.
Figure 19:
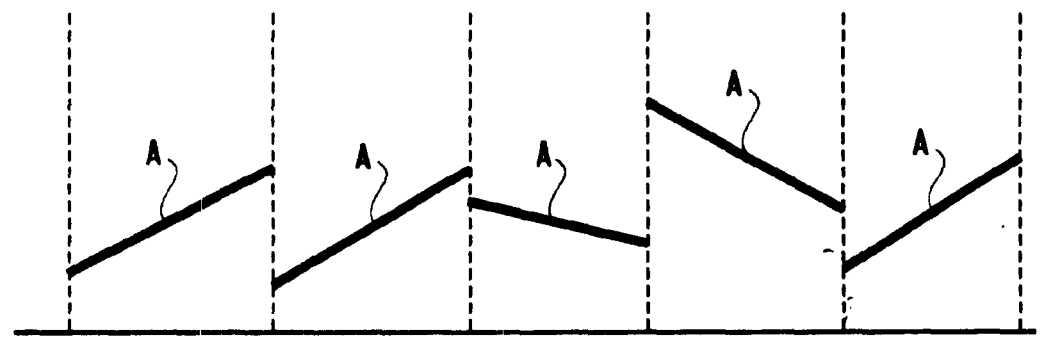

A pattern or relationship is illustrated in FIG. 15. In FIG. 15, the graph shows the relationship between the noise coefficients and the grey level values. For example, in one embodiment, the noise amplitude coefficient at grey level value 128 is 0.375 and the noise amplitude coefficients at grey level values 64 and 192 are 0.125. These values can be adjusted to reflect the particular properties of the printing device. Moreover, the pattern is not limited to a three peak pattern. The pattern may have a multitude of peaks.

The coefficient from the look-up table 13 is fed to the multiplier 15 which multiplies the coefficient and the noise signal generated by the random noise generator 11. The product of this multiplication is the actual random noise signal fed to the adder 5 or threshold circuit 12 of FIG. 3.

FIG. 8 illustrates another embodiment which perturbs a threshold relationship between a modified video image signal and a threshold signal by adding a predetermined pattern to an error diffusion modified video signal. In this embodiment, the pattern injected into the error diffusion modified video signal is either a checkerboard pattern as shown in Tables 1 and 2 below or a vertical line pattern as shown in Tables 3 and 4 below.

In FIG. 8, a pattern generator 17 produces one of the patterns described above which is used in FIG. 3 in lieu of the noise generator by noise generator circuit 10. In other words, the pattern generator circuit 10 of FIG. 8 replaces the noise generator circuit 10 of FIG. 3. The pattern is stored in a look-up table wherein the exact pattern values are determined by the grey level value of the error diffusion modified video signal, a pixel clock signal, and a linesync signal. This way the proper pattern value is matched with the correct pixel of the incoming video signal.

Figure 20:
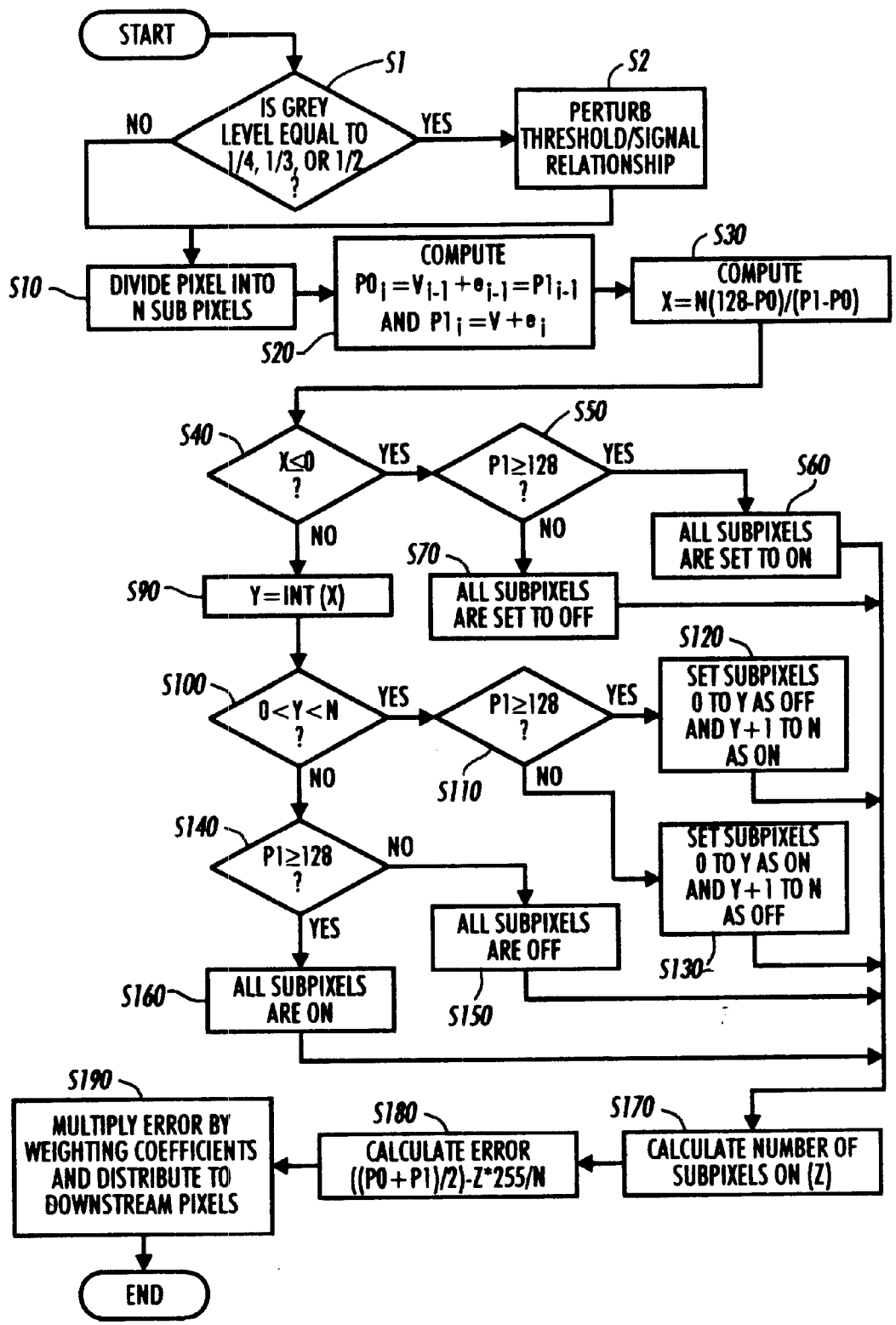
FIGS. 20 and 21 show flowcharts illustrating the perturbing of the video/threshold relationship.
Figure 21:
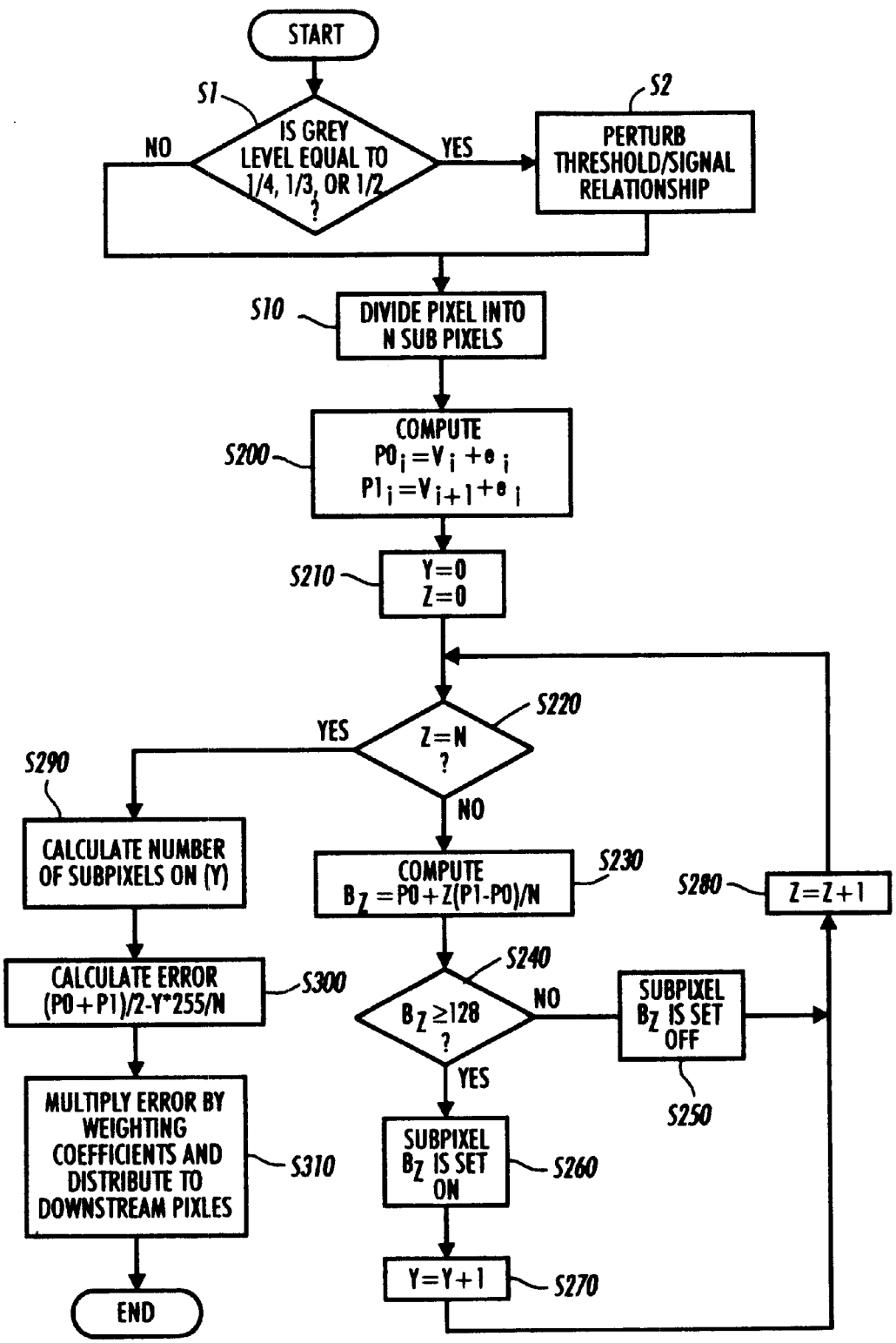

FIGS. 20 and 21 illustrate the general conceptual method utilized by the present invention to perturb the threshold relationship at certain grey levels. For example, FIG. 20 illustrates the perturbing of the threshold/signal relationship when utilizing the first interpolation method described above for a hybrid high addressability error diffusion process.

As illustrated in FIG. 20, at Step S1, it is determined whether the grey level of the image to be threshold is equal to ¼, ⅓, or ½. If the image data is equal to one of these grey levels, the threshold/signal relationship is perturbed at Step S2. After the threshold signal relationship has been perturbed at Step S2 or if the image data has a grey level not equal to ¼, ⅓, or ½, the pixel of video data is divided into N subpixels at step S10.

At Step S20, the values $P0_i$ and $P1_i$ are calculated as described above. Next, at Step S30, the X-coordinate of the point of intersection is determined and normalized by multiplying the difference between 128 and P0 by the value N and dividing this product by the difference of P1 and P0. At Step S40, the normalized value X is compared with the value 0. If X is less than or equal to 0, Step S50 compares the value P1 with the value 128. If the value P1 is greater than or equal to 128, all the subpixels are set to an ON state at Step S60. However, if P1 is less than 128, Step S70 sets all the subpixels to an OFF state.

On the other hand, if Step S40 determines that X is not less than or equal to 0, Step S90 determines the integer value of X and sets this integer value equal to Y. At Step S100, the integer value Y is compared with the values 0 and N. If the value Y lies between 0 and N, Step S10 determines whether the value P1 is less than or equal to 128. If the value P1 is less than 128, Step S120 sets the subpixels 0 to Y to the ON state and the subpixels Y+1 to N to the OFF state. However, if Step S110 determines that the value P1 is greater than or equal to 128, Step S130 sets the subpixels 0 to Y to the OFF state and the subpixels Y+1 to N to the ON state.

If Step S100 determines that the value Y is not between the values 0 and N, Steps S140 determines whether the value P1 is greater than or equal to 128. If the value P1 is greater than or equal to 128, Step S160 sets all subpixels to the ON state. However, if Step S140 determines that the value P1 is less than 128, Step S150 sets all the subpixels to the OFF state.

Upon completing the processes at either Steps S60, S70, S120, S130, S150, or S160, the error diffusion method proceeds to Step S170. At Step S170, the number of ON subpixels is calculated and set equal to Z. Next, at Step S180, the error to be propagated to the downstream pixels is calculated. Namely, the error is calculated to represent the original low spatial resolution. Upon calculating the error in Step S180, Step S190 multiplies the error by weighting coefficients and distributes the weighted error terms to downstream pixels.

FIG. 21 illustrates the perturbing of the threshold/signal relationship when utilizing the second interpolation method described above for a hybrid high addressability error diffusion process.

As illustrated in FIG. 21, at Step S1, it is determined whether the grey level of the image to be threshold is equal to ¼, ⅓, or ½. If the image data is equal to one of these grey levels, the threshold/signal relationship is perturbed at Step S2. After the threshold signal relationship has been perturbed at Step S2 or if the image data has a grey level not equal to ¼, ⅓, or ½, the pixel of video data is divided into N subpixels at step S10.

At Step S200, the P0 and P1 values are computed as noted above. At Step S210, the values Y and Z are set equal 0, wherein Y denotes the number of subpixels which are to be turned ON and Z denotes the addressability factor. At Step S220, Z is compared with N to determined whether all the subpixels within the modified video signal have been thresholded. If it is determined that subpixels remain to be thresholded, the process moves to Step S230 wherein the next subpixel value is computed. Step S240 then compares the computed subpixel value with the threshold value, namely 128. If the subpixel value is greater than or equal to the threshold value, Step S260 sets the subpixel value to the ON state, and Step S270 increments the value Y indicating the number of subpixels that are set ON. However, if the subpixel value is less than 128, Step S250 sets the subpixel value to OFF.

Upon the completion of either Step S250 or Step 270, the process proceeds to Step S280 wherein the high addressability value Z is incremented. This subroutine is repeated until all subpixel values within the modified video signal are compared with the threshold value. Upon completing the comparison of all subpixel values, the process advances to Step S290 wherein the number of ON subpixels are calculated. At Step S300, the error from the threshold process is calculated so that the value represents the original lower spatial resolution. Upon calculating the error, Step S310 multiplies the error by weighting coefficients and distributes the error to downstream pixels.

It is noted that although the methods illustrated in FIGS. 20 and 21 show Step S1 making a determination with respect to three grey level values, Step S1 can be modified from a three value decision state to a state making a determination as to what is the actual the grey level value of the image signal. With this modification, the branch from Step S1 directly to Step S10 is eliminated, and Steps S2, S21, S22, S23, and S24 perturb the threshold/signal relationship for every pixel with a different value. In this way, the threshold/signal relationship is perturbed over the entire image wherein each possible grey level has assigned thereto an individual perturbing pattern value as in FIG. 8 or an individual coefficient value as in FIG. 9.

At midtone regions in an image, the possible periodic patterns for equal numbers of white and black pixels are checkerboard, vertical lines, or horizontal lines. Conventionally, the images are left to settle into one of these stages, depending of the weighting coefficients and the boundary conditions of the image processing operation. From a symmetric point of view, however, if the threshold in the error diffusion process is perturbed in a particular manner, the output from the thresholding process would be able to lock into a particular binary output having a certain state. This locking in result would effect the final appearance of the image by reducing the pattern shifting artifacts discussed above.

Figure 10:
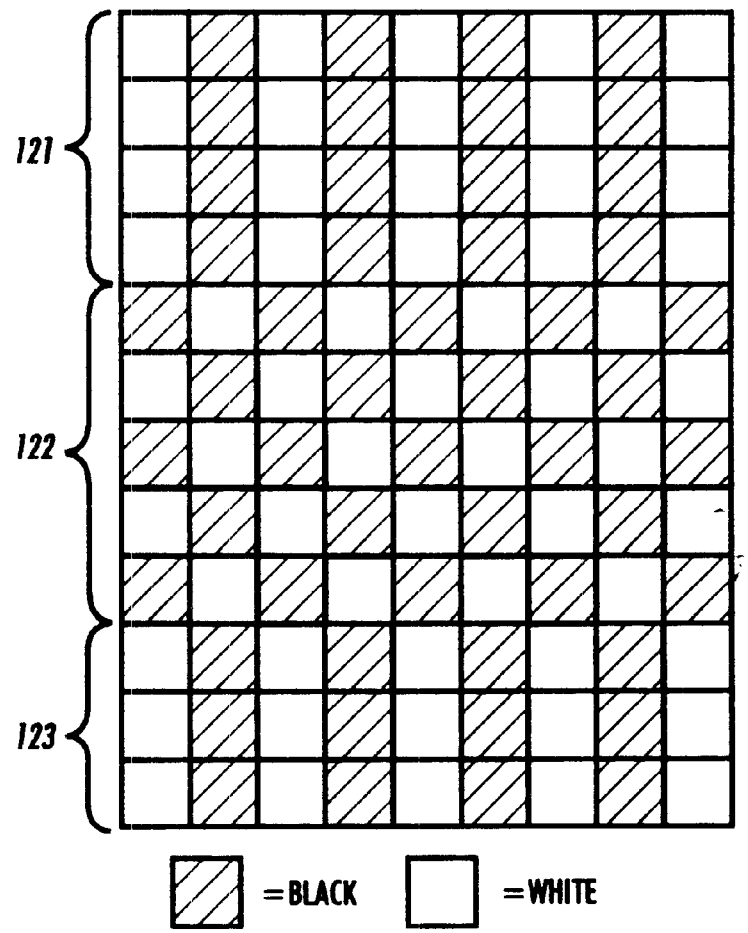
FIG. 10 shows a pixel representation illustrating the artifact of periodically repeating checkerboard and vertical line patterns in a particular grey level image region.

FIG. 10 illustrates a pattern shifting artifact occurring at a grey level corresponding to ½ or 128 when the image signal is represented by an eight bit byte. It is noted that in the section corresponding to 121, the pattern is one of vertical lines, whereas the pattern in section 122 is a checkerboard pattern. Moreover, as the image proceeds to section 123, the pattern shifts back to a vertical line pattern. It is this pattern shifting in the midtone region (a region having a grey value of 128 out of a possible 255) that creates the pattern shifting artifact that can be distracting to the actual appearance of the image.

It is noted that the shaded squares in FIG. 10 represent black pixels in the image to be reproduced and the non-shaded squares in FIG. 10 represent white pixels in the image to be reproduced. This convention is also used in FIGS. 11, 12, 13, and 14. If the present invention is utilized in a color apparatus, the shaded squares in FIG. 12 would represent to be printed pixels for a particular color space (toner or ink) and the non-shaded squares in FIG. 12 would represent not to be printed pixels for a particular color space (toner or ink).

Figure 11:
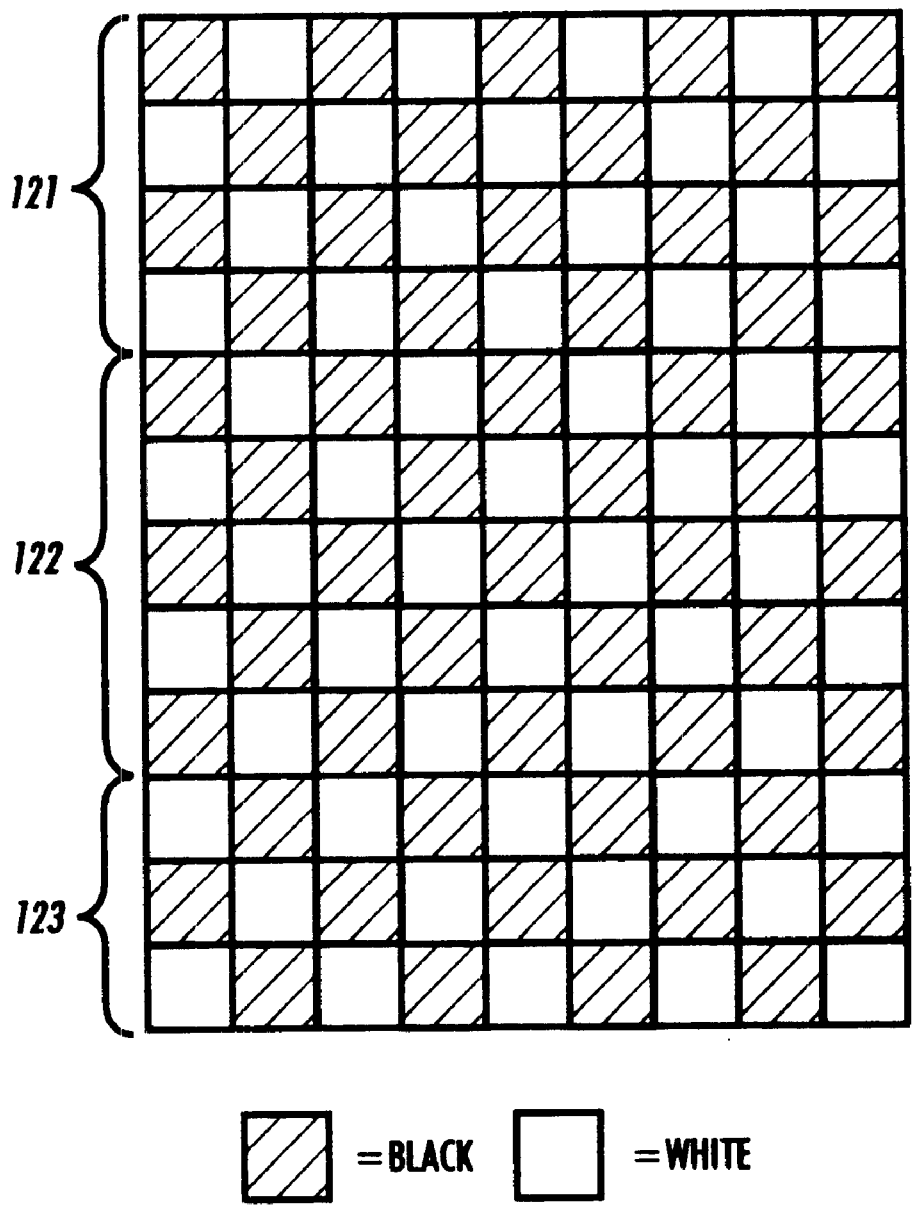
FIG. 11 shows a pixel representation wherein the artifact of FIG. 10 is eliminated by forcing the image at the particular grey level to be rendered as a checkerboard pattern.

FIG. 11 illustrates the sane midtone region (½ or 128 grey level) as illustrated in FIG. 10 without the pattern shifting artifact. More specifically, the image illustrated in FIG. 11 is rendered utilizing a constant threshold at 128 which is modulated with an amplitude of 20 in a checkerboard pattern or scheme. More specifically, the actual threshold value generated for utilization by a binarization circuit would be represented by the pattern illustrated in Table 1 below.

TABLE 1

| 108 | 148 | 108 | 148 |
| 148 | 108 | 148 | 108 |
| 108 | 148 | 108 | 148 |
| 148 | 108 | 148 | 108 |

On the other hand, Table 2 shows the value pattern added to the image signal to implement the checkerboard pattern when the system modifies the image signal.

TABLE 2

| −20 | 20 | −20 | 20 |
| 20 | −20 | 20 | −20 |
| −20 | 20 | −20 | 20 |
| 20 | −20 | 20 | −20 |

Figure 12:
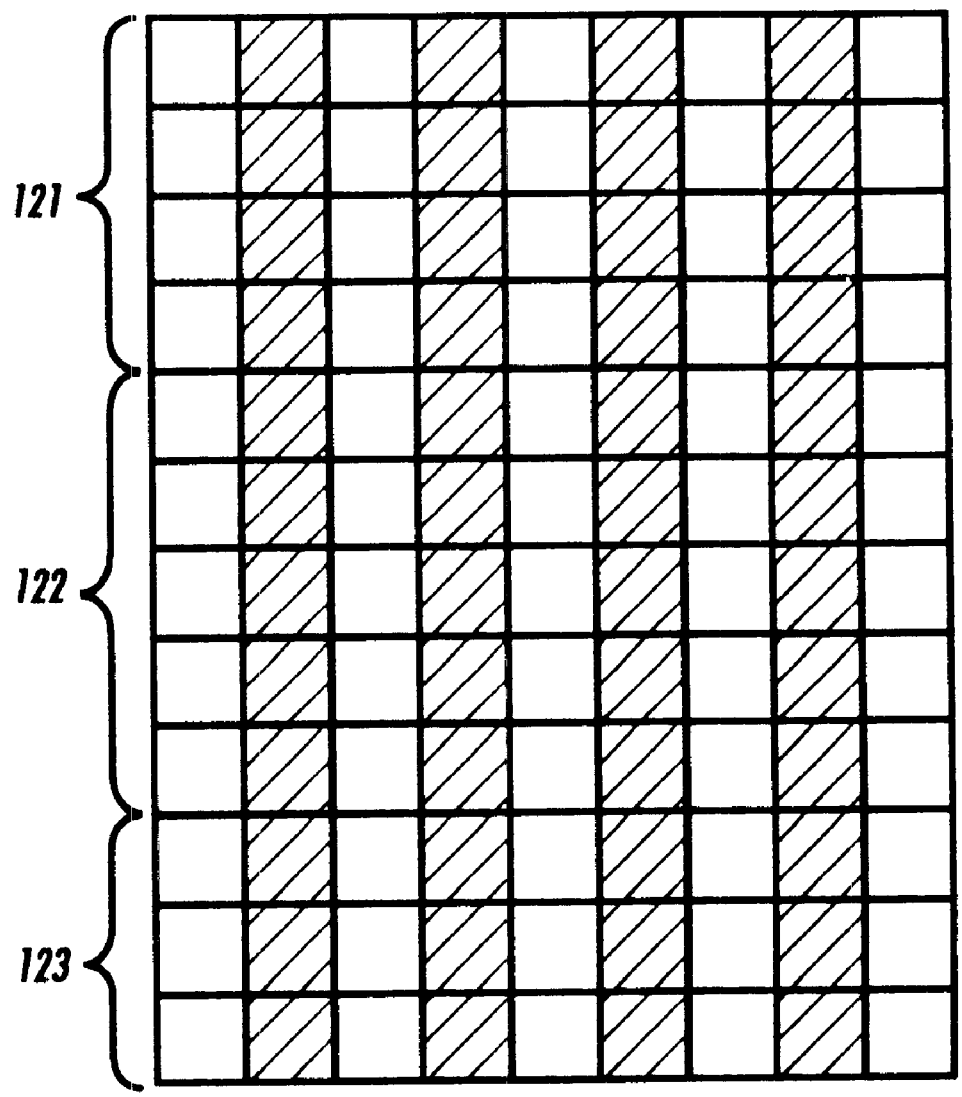
FIG. 12 shows a pixel representation illustrating the elimination of the artifact of FIG. 10 by forcing the certain grey level to be represented by a vertical line pattern.

FIG. 12 illustrates the same midtone region (½ or 128 grey level) as illustrated in FIG. 10 without the pattern shifting artifact. More specifically, the image illustrated in FIG. 12 is rendered utilizing a constant threshold at 128 which is modulated with an amplitude of 20 in a vertical line pattern or scheme. More specifically, the actual threshold value generated for utilization by a binarization circuit would be represented by the pattern illustrated in Table 3 below.

TABLE 3

| 108 | 148 | 108 | 148 |
| 108 | 148 | 108 | 148 |
| 108 | 148 | 108 | 148 |
| 108 | 148 | 108 | 148 |

On the other hand, Table 4 shows the value pattern added to the image signal to implement the vertical line pattern when the system modifies the image signal.

TABLE 4

| −20 | 20 | −20 | 20 |
| −20 | 20 | −20 | 20 |
| −20 | 20 | −20 | 20 |
| −20 | 20 | −20 | 20 |

It is noted that, in the above Tables, a row represents a fast scan direction or electronic scanning direction, whereas a column represents a slow scan direction or mechanical scanning direction.

Figure 13:
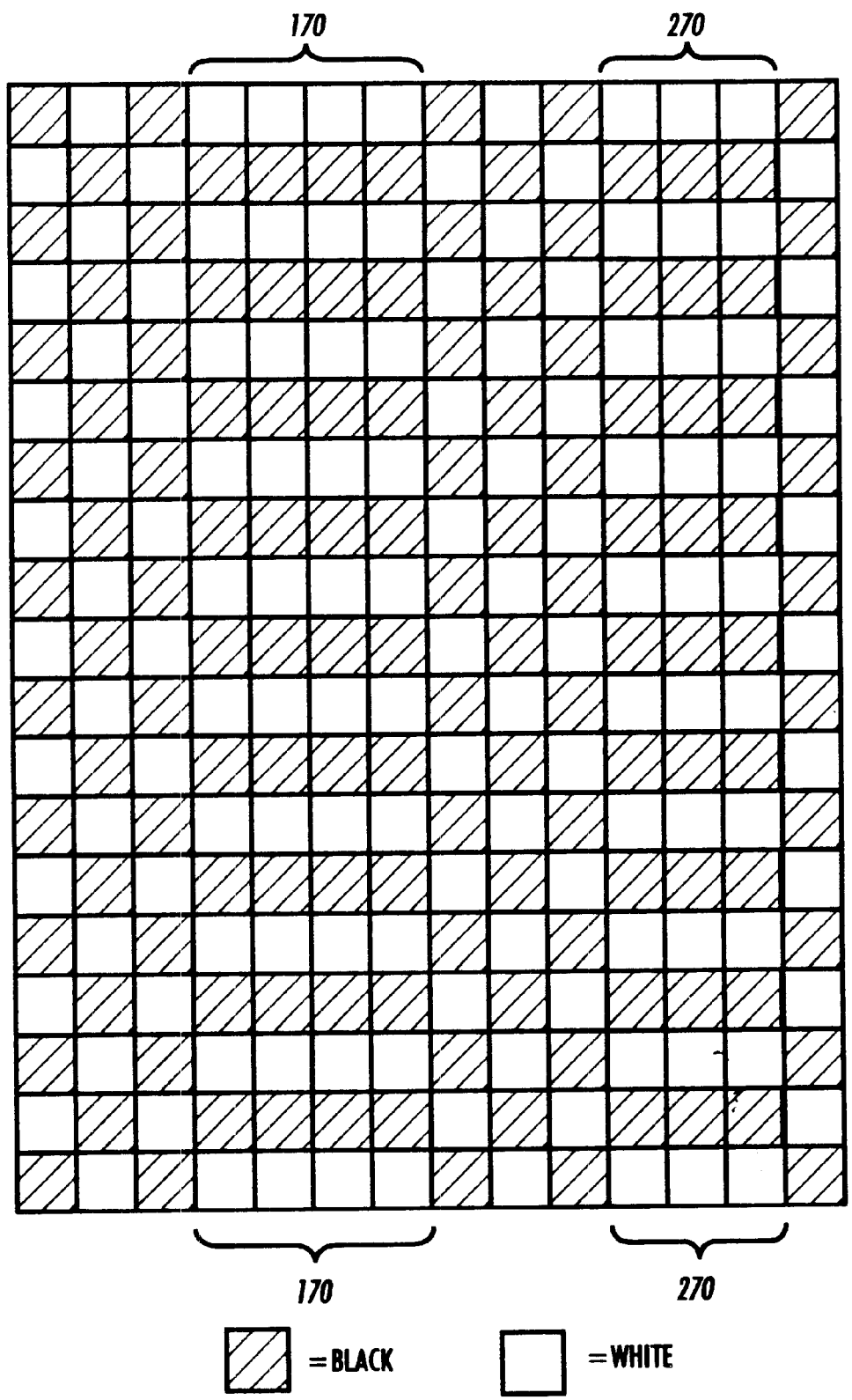
FIG. 13 shows a pixel representation of a certain grey level without threshold permutation.

FIG. 13 illustrates a pixel representation of another pattern shifting artifact in a midtone region (a grey level corresponding to 128 or ½ for an eight bit image data byte). In FIG. 13, section 170 represents an area where a predominant horizontal line pattern is found. Moreover, section 270 also represents an area having a predominant horizontal line pattern. Thus, it is noted that the pattern shifts from a horizontal line pattern in section 170 to a checkerboard pattern then back to a horizontal line pattern in 270 as one travels in a fast scan direction. This pattern shifting artifact is substantially reduced in FIG. 14.

Figure 14:
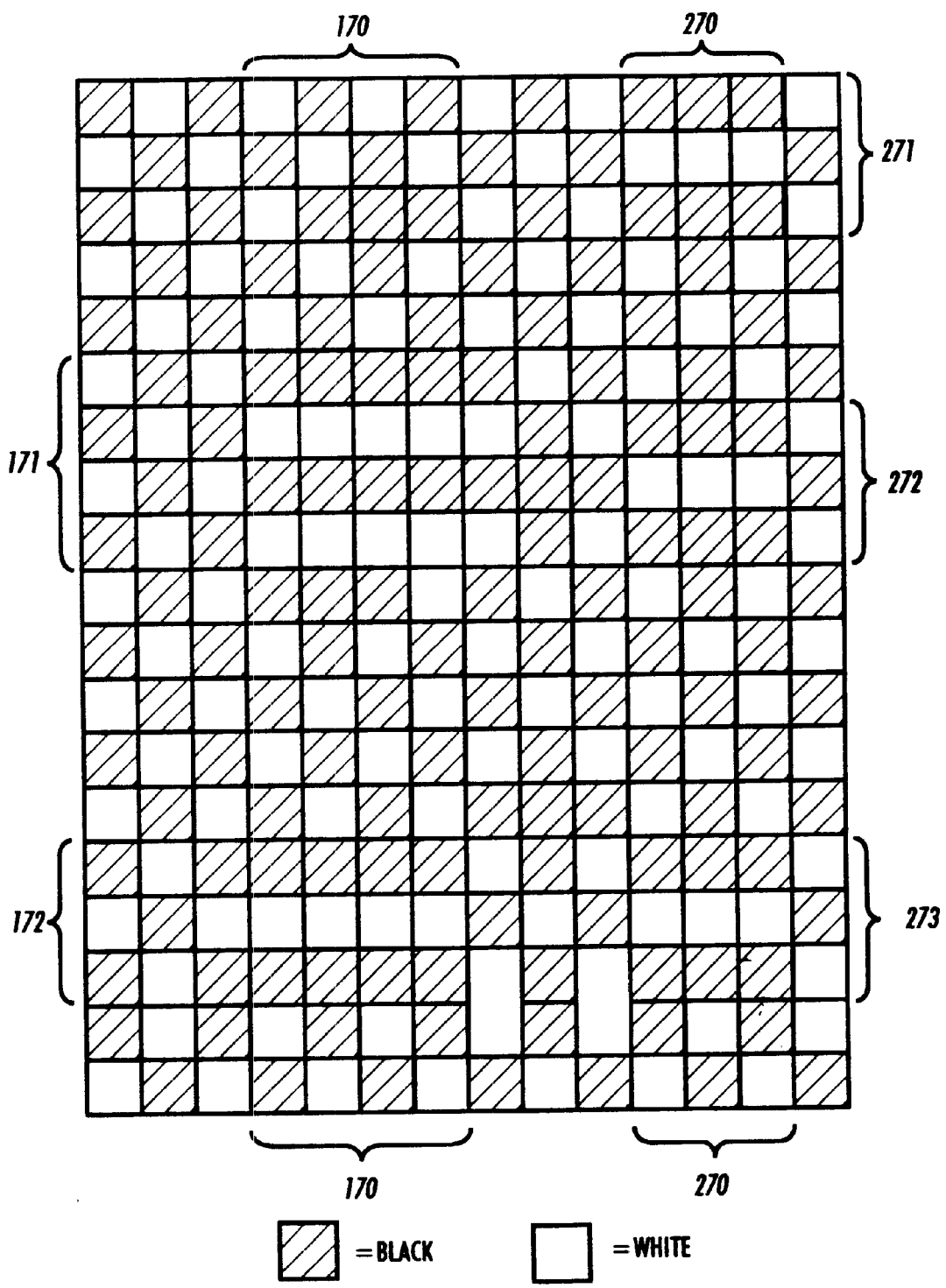
FIG. 14 shows a pixel representation illustrating the results of performing threshold permutation on the image of FIG. 13.

In FIG. 14, the midtone region (128 or ½ grey level) is rendered by perturbing the threshold/signal relationship with the inclusion of random noise. In the rendering of the image, the horizontal line patterns are restricted to the areas where sections 171 and 172 overlap section 170 or the areas which correspond to the overlapping of section 270 with sections 271, 272, and 273. The addition of random noise for a particular grey level enables the image to be rendered with a substantial reduction in the pattern shifting artifact.

An additional benefit of allowing both the location and the intensity of the threshold relationship perturbation to be programmable is a flexibility to properly apply the correct amount of perturbing noise to any type of preprocessed image prior to applying error diffusion. Preprocessing operations include tonal reproduction curve (TRC) input mapping, gain and offset adjustment, spot overlap compensation, etc. These preprocessing operations all tend to shift objectionable periodic patterns to input grey level location other than what has been conventionally expected.

Moreover, the noise look-up table can be uniquely programmed and optimized to render images with good quality corresponding to any of the situations described above. More specifically, if the image is preprocessed utilizing a TRC input mapping and gain and offset adjustment, the artifact of pattern shifting can be centered at an input grey level of around 220. Thus, knowing that the pattern shifting artifact has been centered at a different input grey level, the noise look-up table can be programmed to inject random noise into the threshold/video signal relationship when the image signal is at a grey level around the new pattern shifting grey level. Thus, the programmability of the noise look-up table allows the present invention to be readily adaptable to any printing situation.

As noted above, one problem associated with error diffusion is the occurrence of periodically repeating patterns. Conventionally, perturbing of the error diffusion threshold level only at certain grey levels which were identified as producing potential objectionable patterns is used. However, merely perturbing the error diffusion threshold level based on the grey level of the video signal does not always remove the objectionable patterns. Moreover, the conventional perturbation systems are static and thus preventing the system from dynamically perturbing the error diffusion threshold level when needed.

A dynamic noise profile perturbing can remove objectionable patterns anywhere within an image by controlling the application of the perturbation based a number of factors. More specifically, the perturbing of the error diffusion threshold level can utilize several noise profiles and be dynamically selected on a per pixel basis based upon window effect pointers or image classification from an auto segmentation routine in addition to a certain grey level. This dynamic aspect of the perturbing of the error diffusion threshold level allows each predefined windowed region to have different noise profile requirements.

Figure 22:
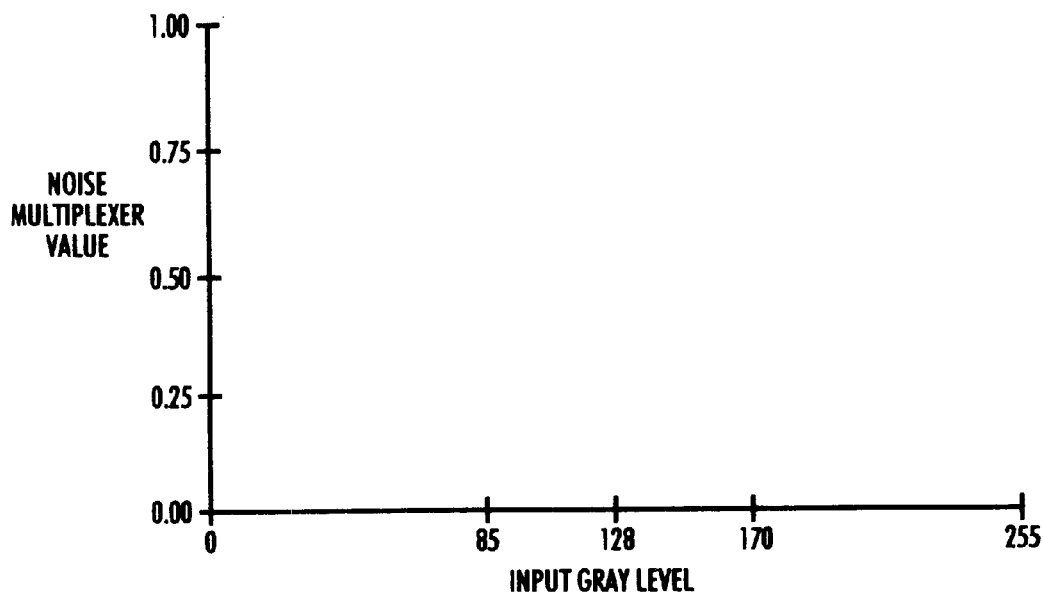
FIG. 22 illustrates a noise profile with no noise to be added to the video/threshold relationship according to the concepts of the present invention.
Figure 23:
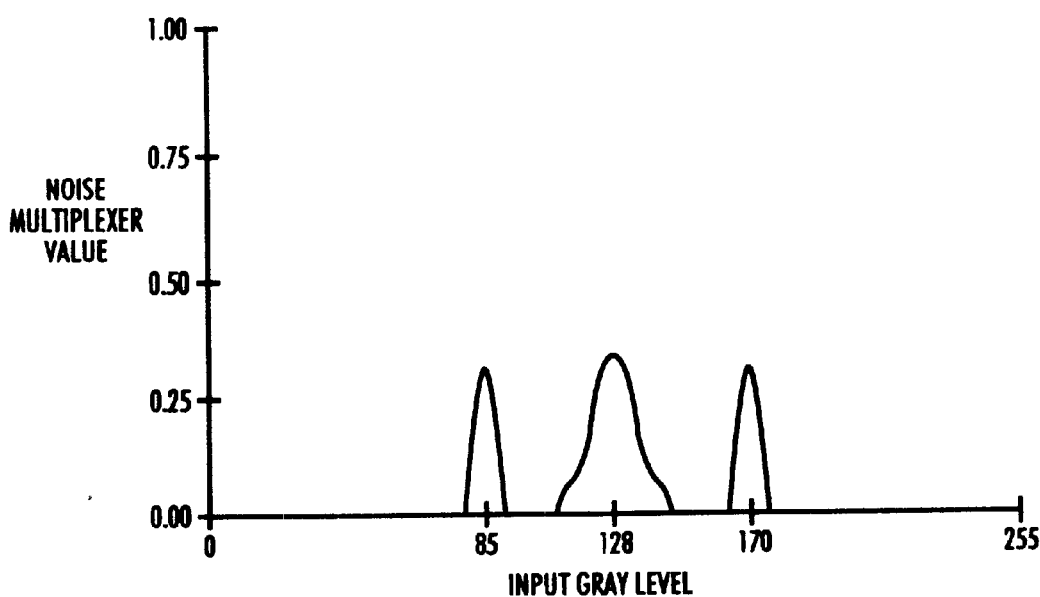
FIG. 23 illustrates a noise profile with noise to be added to the video/threshold relationship centered at three grey levels according to the concepts of the present invention.
Figure 24:
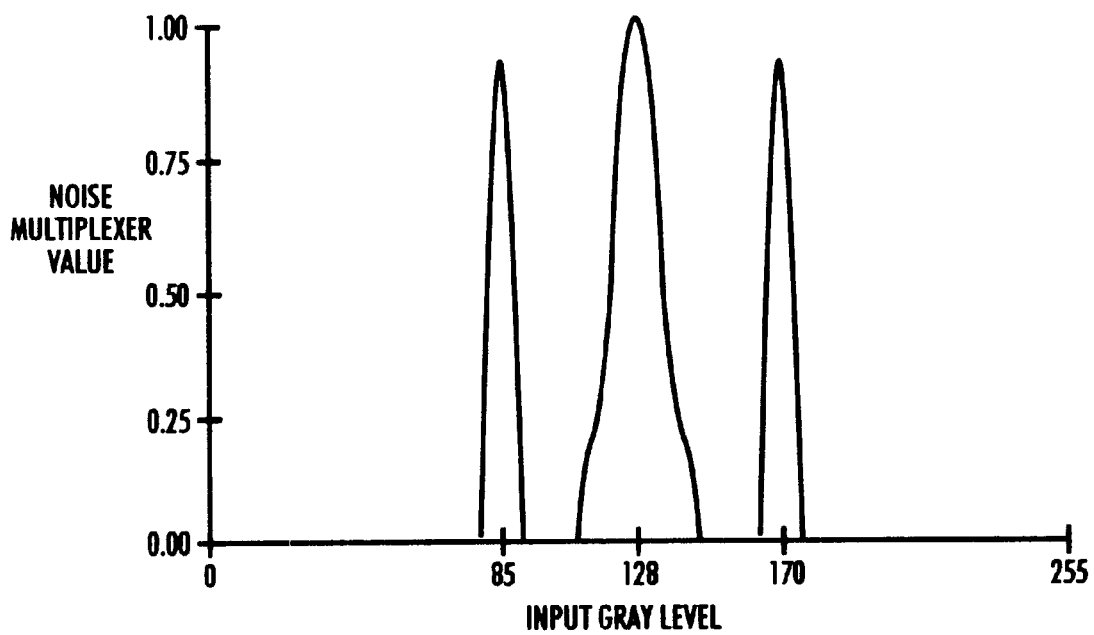
FIG. 24 illustrates a noise profile with amplified noise to be added to the video/threshold relationship centered at three grey levels according to the concepts of the present invention.

FIGS. 22–24 show various noise profiles that can be utilized in a dynamic perturbation system according to the concepts of the present invention. For example, FIG. 22 illustrates a noise profile wherein the error diffusion threshold level is not perturbed at any grey level or any window effect pointer. On the other hand, FIG. 23 illustrates a noise profile which may be selected based on the grey level of the video signal and the window effect pointer associated with the pixel being processed. FIG. 24 illustrates a modification of the noise profile of FIG. 23 wherein the noise has been overamplified.

As noted above, merely relying on the grey level of the video signal to assign the noise profile to be utilized to perturb the error diffusion threshold level does not necessarily remove all the objectionable artifacts in the rendered image. For example, the objectionable patterns may not always be at the same location relative to the input grey level when the image is being processed utilizing a specific TRC, a specific number of high-addressable bits, or a spot-overlap look-up table specifically tuned for a certain appearance. In such a situation, an objectionable binary output level may be shifted to another input grey level. Thus, the selection of the noise profile is based upon not only the grey level of the video signal being received but also upon the window effect pointer or other image classification information which is utilized to process the video signal. A window effect pointer is a dataword which contains information about the image classification of the associated pixel so that the proper image processing operations are performed on the pixel. This information can be developed by any conventional image segmentation or auto-segmentation routine. An example of a process which produces window effect pointers, image classification information, is described in U.S. Pat. No. 5,513,282. The entire contents of U.S. Pat. No. 5,513,282 are hereby incorporated by reference.

Figure 25:
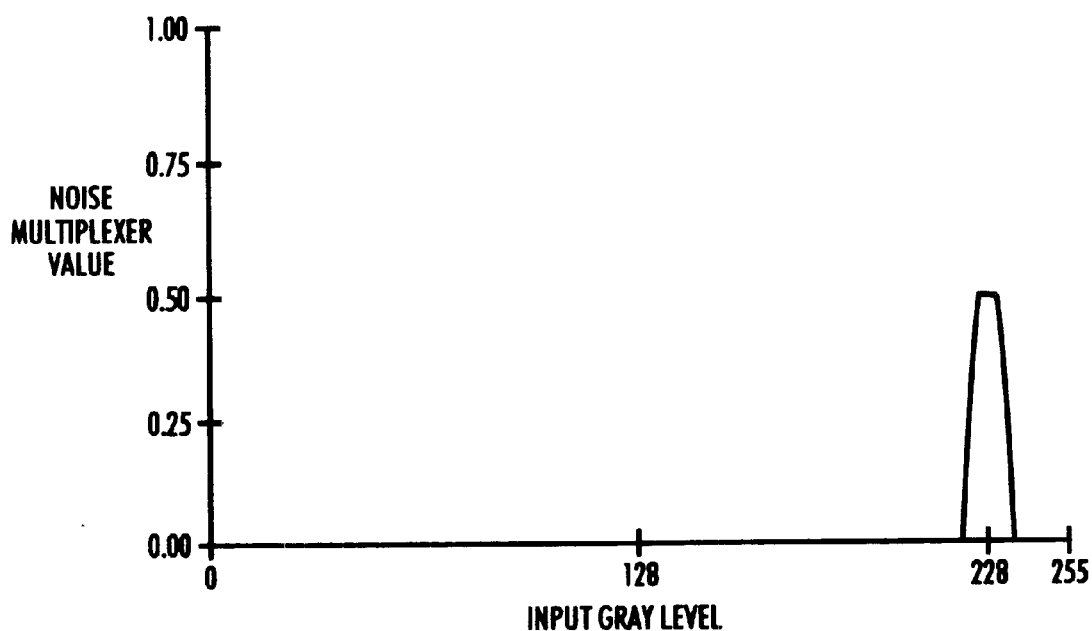
FIG. 25 illustrates a noise profile with noise to be added to the video/threshold relationship centered at a single grey level based on the image classification of the pixel being processed according to the concepts of the present invention.

FIG. 25 illustrates a noise profile which is centered around the input grey level 228 for processing images utilizing a specific TRC, a specific number of high-addressable bits, and a spot overlap look-up table specifically tuned for a predetermined appearance. This noise profile would be selected based upon the window effect pointer of the pixel and grey level of the pixel, or the just window effect pointer if noise profile is generated from a programmable look-up table that is programmable from the pixel's grey level.

Figure 26:
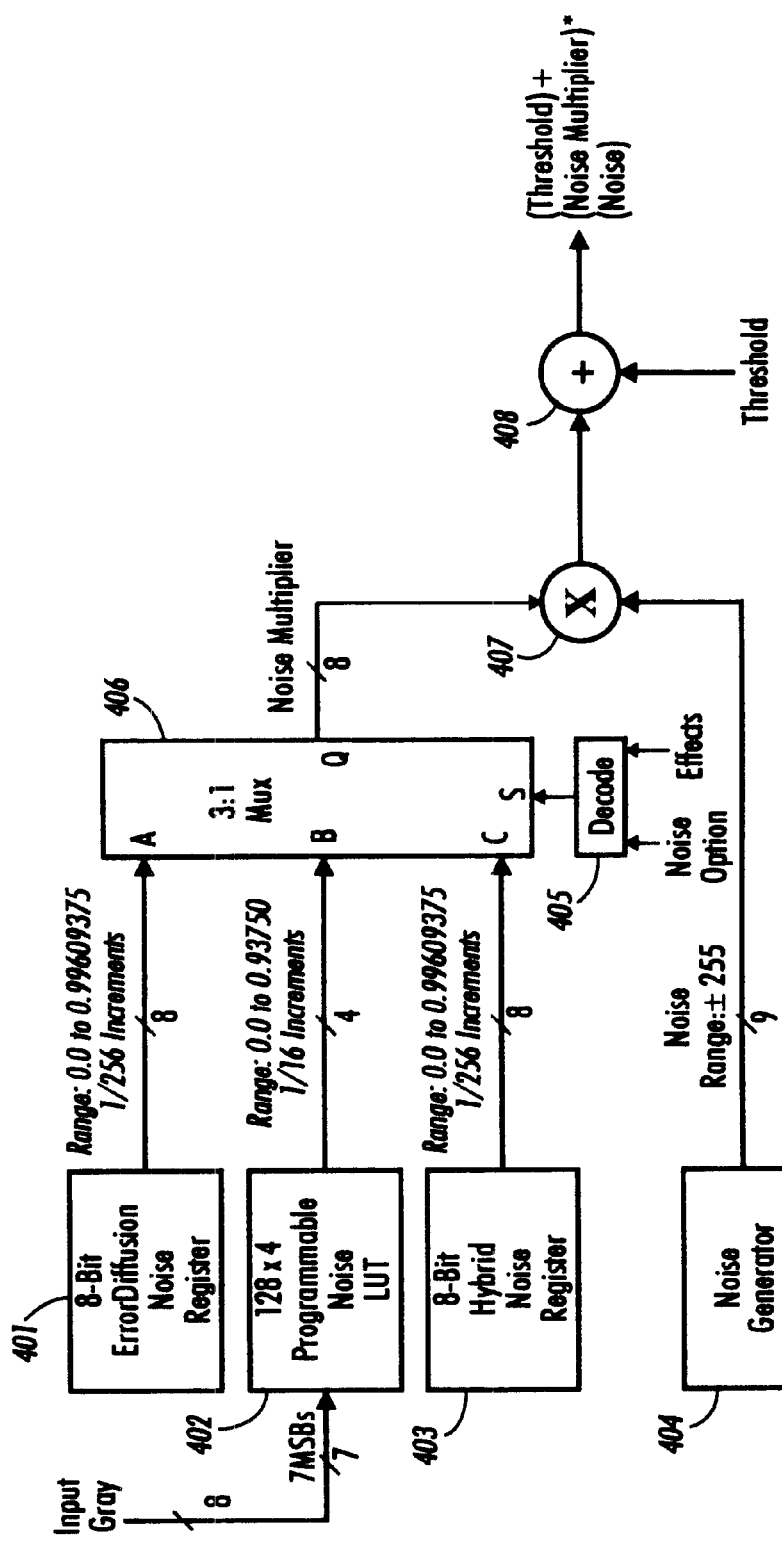
FIG. 26 is a block diagram illustrating a circuit that selects a noise profile based on an image processing mode according to the concepts of the present invention.

FIG. 26 illustrates a block diagram of a noise profile circuit according to the concepts of the present invention. As illustrated in FIG. 26, registers 401 and 403 contain constant noise profiles associated with error diffusion and hybrid error diffusion, respectively. FIG. 26 also shows a programmable noise look-up table 402 wherein the noise profile outputted by the look-up table 402 is dependent upon the input grey level of the video signal. Registers 401 and 403 and look-up table 402 are fed to a multiplexer 406 which selects which noise profile that will be utilized to perturb the error diffusion threshold level based on decoding information from decoding circuit 405.

The decoding circuit 405 produces a signal to select the proper noise profile based upon the window effect bits associated with the pixel being processed and a noise option signal which indicates whether the noise option should be utilized or suppressed. The noise profile from multiplexer 406 is fed to multiplier 407 wherein the noise profile is multiplied with a signal generated from noise generator 404 to produce a noise signal that will be utilized to perturb the error diffusion threshold level. This noise signal is fed to adder 408 wherein the noise signal is added to the threshold value so as to perturb the relationship between the threshold and the incoming video signal. Although FIG. 26 illustrates the adding of the noise to the threshold signal, this noise can also be added directly to the video signal, the error signal, or the video signal after it has been modified by the diffused error signal. In either situation, the noise is perturbing the relationship between the video signal and the threshold signal.

Figure 27:
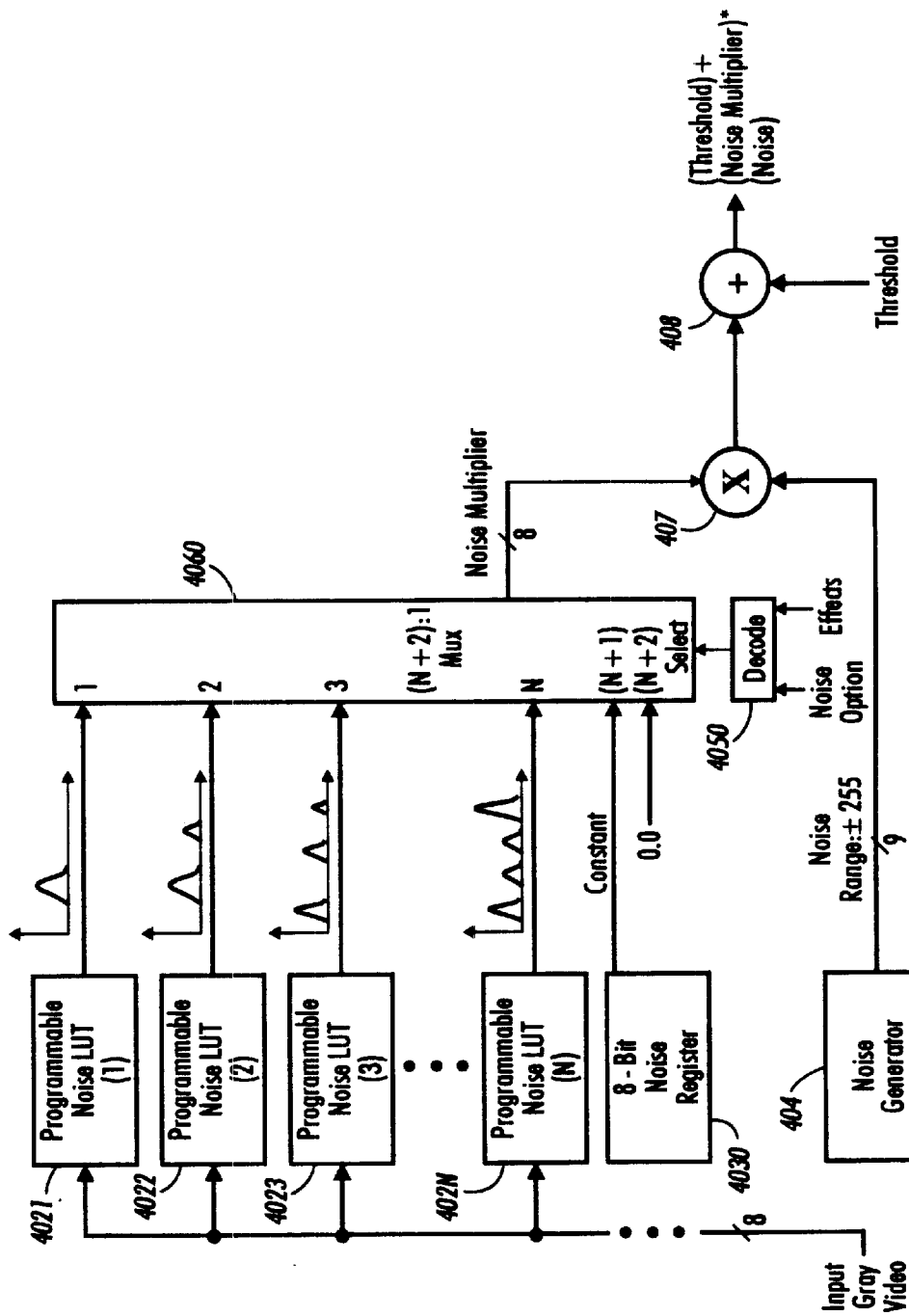
FIG. 27 is a block diagram illustrating a circuit that dynamically selects a noise profile based on an image processing classification of a pixel being processed according to the concepts of the present invention.

The circuit of FIG. 26 can be further extended to provide a generic architecture that will allow several noise profile look-up tables to be accessible and selected based upon the window effects pointers. An example of this extension is illustrated in FIG. 27. As illustrated in FIG. 27, a plurality of programmable noise look-up tables 4021, 4022, 4023, . . . 402N are connected to a multiplexer 4060. Multiplexer 4060 is also connected to the register 4030 which has a constant noise and an input 0 which would be selected when the noise option is to be suppressed. A decoding circuit 4050 determines which programmable noise profile is outputted by the multiplexer 4060 based upon the window effect pointer bits; i.e., the image classification of the pixel being processed. As in FIG. 26, the noise multiplier from multiplexer 4060 is fed to multiplier 407 to be multiplied with the noise generated by noise generator 404.

As mentioned above, the location of the objectionable textures or artifacts may change whenever the spot-overlap look-up table is modified and/or the amount of screen modulation is varied. This may be especially important in an auto-windowing environment where each window region may have a specific and different texture to perturb based upon the classification and characteristics of that object; i.e., determined from the object's histogram and overall window segmentation statistics. Thus, each object can be processed with a unique noise profile that can be dynamically assessed and selected based upon the window effects pointers.

Figure 28:
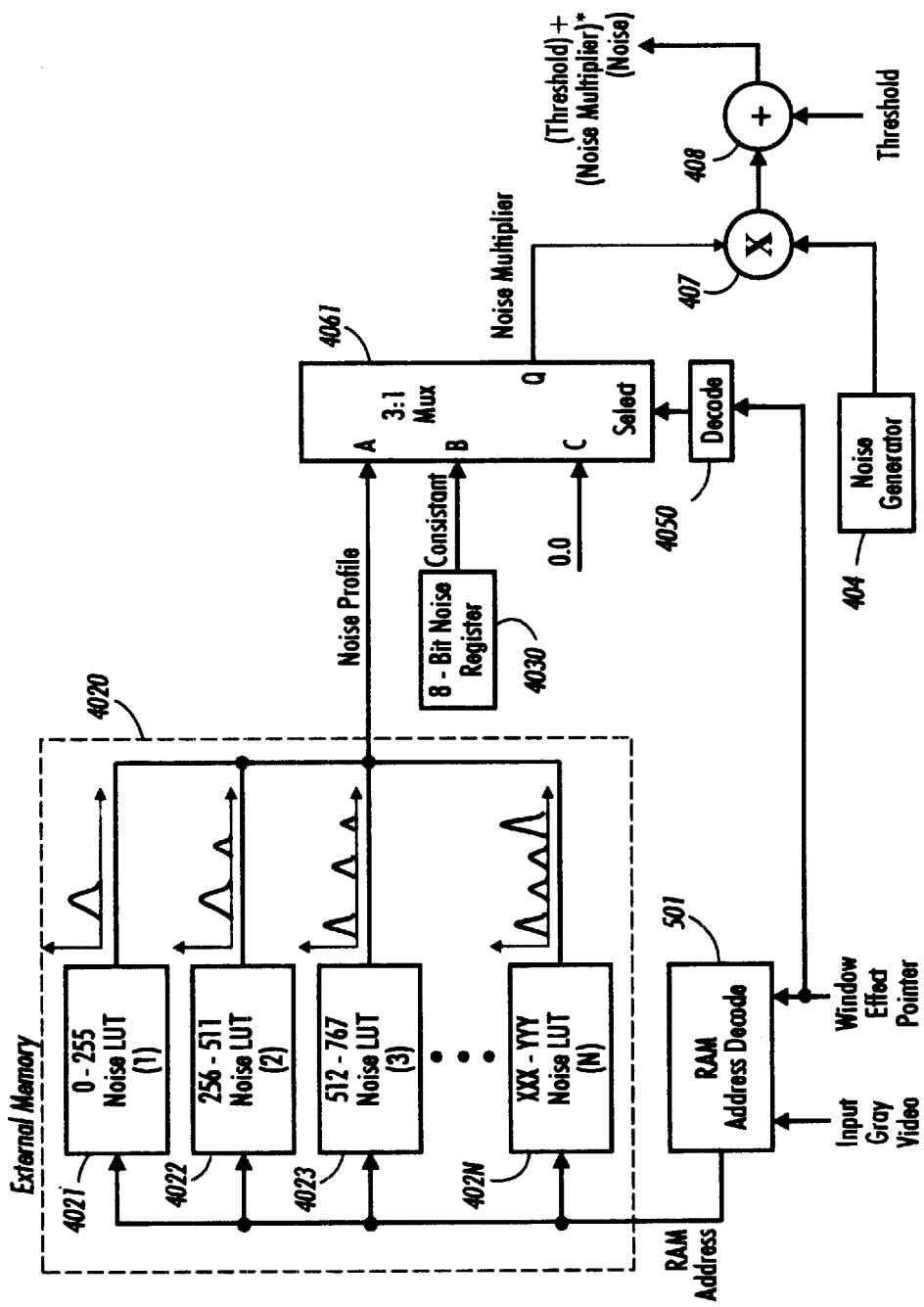
FIG. 28 is a block diagram illustrating a circuit that dynamically selects a noise profile based on an image processing classification of a pixel being processed using external RAM to store the noise profiles according to the concepts of the present invention.
Figure 29:
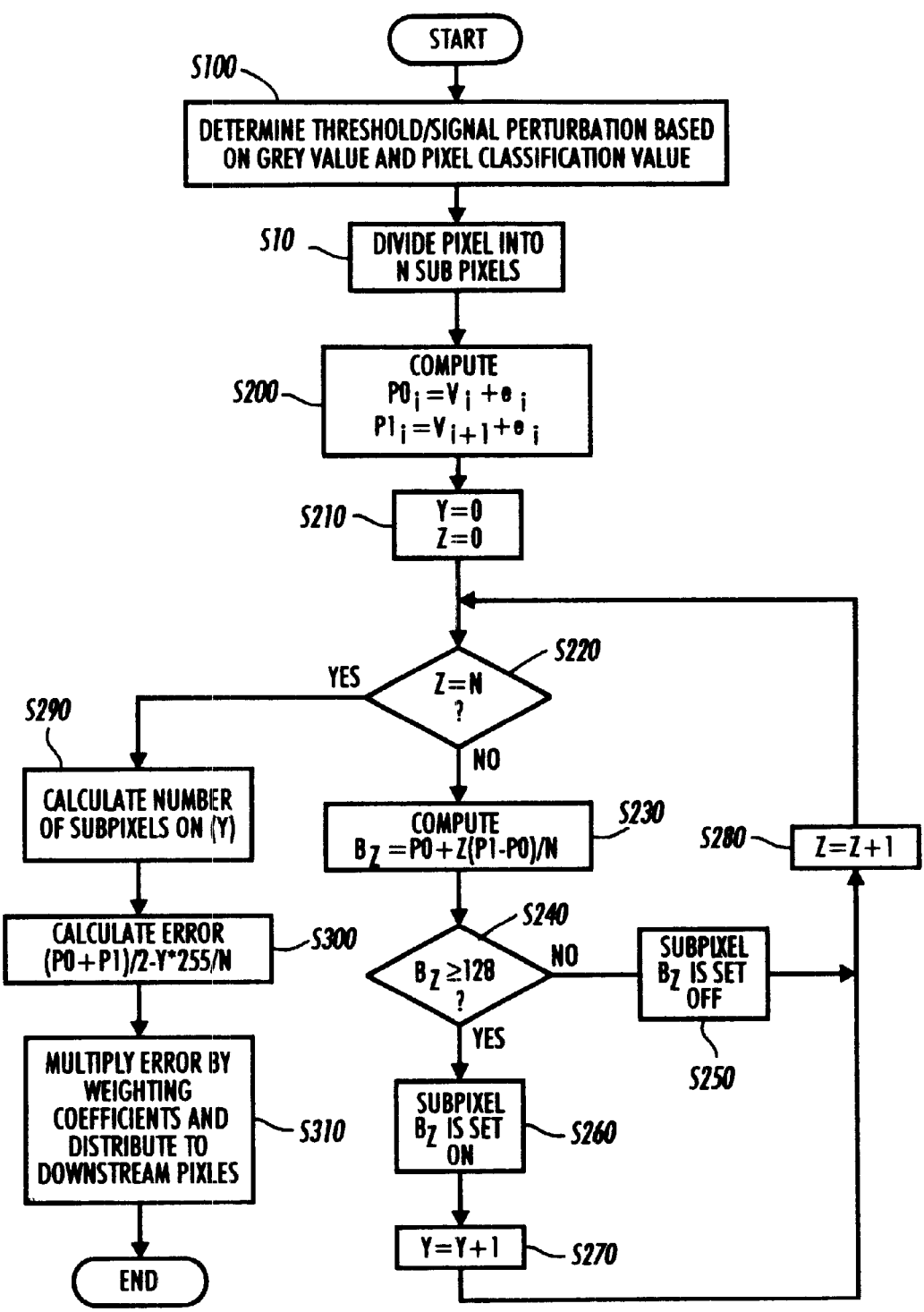
FIG. 29 shows a flowchart illustrating the perturbing of the threshold/signal according to the concepts of the present invention.

FIG. 28 illustrates another architecture which utilizes external memory to store each noise profile since only one noise value is required for every pixel. In this example, the various programmable noise look-up tables of FIG. 27 are stored in a external memory 4020 which outputs the desired noise profile to multiplexer 4061. The window effect pointer and grey level video value are used to decode and access the external random access memory bank through random access memory address decoder circuit 501. The window effects pointer is also used by decoding circuit 4050 to determine which value the multiplexer 4061 will output as the multiplier to multiplier 407. The number of noise profiles utilized in this example can be easily expanded simply adding more memory to the external memory 4020.

In describing the present invention, the terms pixel and subpixel have been utilized. These terms may refer to an electrical (or optical, if fiber optics are used) signal which represent the physically measurable optical properties at a physically definable area on a receiving medium The receiving medium can be any tangible document, photoreceptor, or marking material transfer medium. Moreover, the terms pixel and subpixel may refer to an electrical (or optical, if fiber optics are used) signal which represent the physically measurable optical properties at a physically definable area on a display medium. A plurality of the physically definable areas for both situations represent the physically measurable optical properties of the entire physical image to be rendered by either a material marking device, electrical or magnetic marking device, or optical display device.

Lastly, the term pixel may refer to an electrical (or optical, if fiber optics are used) signal which represents physical optical property data generated from a single photosensor cell when scanning a physical image so as to convert the physical optical properties of the physical image to an electronic or electrical representation. In other words, in this situation, a pixel is an electrical (or optical) representation of the physical optical properties of a physical image measured at a physically definable area on an optical sensor.

The present invention has been described in detail above; however, various modifications can be implemented without departing from the spirit. For example, the preferred embodiment of the present invention has been described with respect to a binary printing system; however, this perturbing system can be applied to any situation where multi-bit image data byte is to be reduced or converted to an image data byte having less bits. Moreover, the perturbation method can be readily implemented on an ASIC, thereby enabling the placement of this process in a scanner, electronic subsystem, printer, or display device.

Moreover, the present invention has been described with respect to a video range of 0 to 255. However, it is contemplated by the present invention that the video range can be any suitable range to describe the grey level of the pixel being processed. Furthermore, the present invention is readily applicable to any rendering system, not necessarily a binary output device. It is contemplated that the concepts of the present invention are readily applicable to a four-level image output terminal or higher.

Lastly, the present invention has been described with respect to a monochrome or black/white environment. However, the concepts of the present invention are readily applicable to a color environment. Namely, the perturbation process of the present invention can be applied to each color space value representing the color pixel.

In recapitulation, the present invention enables dynamic selection of one to several noise profiles to perturb the threshold in areas where the occurrence of periodically repeating patterns may generate unacceptable or objectionable rendering art effects or textures under hybrid and/or error diffusion processing. Moreover, the present invention can be utilized in a two-pass auto windowing environment where each predefined window region or object may have a different noise profile requirement.

While the present invention has been described with reference to various embodiments disclosed herein before, it is not to be combined to the detail set forth above, but is intended to cover such modifications or changes as made within the scope of the attached claims.

What is claimed is:

1. A system for processing image data having a multi-level grey signal having a first number of grey levels, comprising:

means for receiving a multi-level grey scale pixel value representing a pixel having a first resolution;

threshold means for generating a threshold value;

reduction means for reducing the number of levels in the multi-level grey scale pixel value;

error means for generating an error value as a result of the reduction process by said reduction means;

diffusing means for diffusing the error value to multi-level grey scale pixel values of adjacent pixels; and perturbing means for perturbing the relationship between the threshold value and the multi-level grey signal according to an image classification of the multi-level grey scale pixel value and a grey level of the multi-level grey scale pixel value, the image classification being generated by an autosegmentation process, thereby effecting the output from said reduction means.

2. The system as claimed in claim 1, wherein said perturbing means changes the threshold value by a predetermined value.

3. The system as claimed in claim 1, wherein said perturbing means changes the multi-level grey scale pixel value by a predetermined value.

4. The system as claimed in claim 1, wherein said perturbing means changes the error value by a predetermined value.

5. The system as claimed in claim 1, wherein said perturbing means dynamically selects from a plurality of noise profiles to generate a value that perturbs the relationship between the threshold value and the multi-level grey signal.

6. The system as claimed in claim 1, further comprising:

converting means for converting the multi-level grey scale pixel value to a second resolution prior to being received by said reduction means, the second resolution being higher than the first resolution;

said error means generating an error value having a resolution corresponding to the first resolution.

7. The system as claimed in claim 6, wherein said converting means computes a plurality of multi-level grey scale subpixel values $B_n$, the multi-level grey scale subpixel values $B_n$ being equal to $P0+n(P1-P0)/N$, wherein n is equal to 0 to N−1, P0 is equal to the first multi-level grey scale pixel value, P1 is equal to the second multi-level grey scale pixel value, and N is equal to a high addressability characteristic.

8. The system as claimed in claim 7, wherein said converting means calculates a desired output, the desired output being equal to a sum of the first and second multi-level grey scale pixel values divided by two, calculates an actual output, the actual output being equal to a lowest screen value of a line screen plus a number of subpixels being equal to or greater than a threshold value multiplied by a difference between a maximum screen value of the line screen and the lowest screen value of the line screen divided by a high addressability characteristic, and calculates the error value to be equal to the desired output minus the actual output.

9. A method of processing image data having a multi-level grey signal having a first number of grey levels, comprising the steps of:

(a) receiving a multi-level grey scale pixel value representing a pixel having a first resolution;

(b) reducing the number of levels in the multi-level grey scale pixel value;

(c) generating an error value as a result of the reduction process in said step (b);

(d) diffusing the error value to multi-level grey scale pixel values of adjacent pixels; and (e) perturbing the relationship between the threshold value and the multi-level grey signal according to an image classification of the multi-level grey scale pixel value and a grey level of the multi-level grey scale pixel value, the image classification being generated by an autosegmentation process.

10. The method as claimed in claim 9, wherein said step (e) changes the relationship by a predetermined value.

11. The method as claimed in claim 9, wherein said step (e) dynamically selects from a plurality of noise profiles to generate a value that perturbs the relationship between the threshold value and the multi-level grey signal.

12. The method as claimed in claim 9, further comprising the step of:

(f) converting the multi-level grey scale pixel value to a second resolution prior to the execution of said step (b), the second step resolution being higherthan the first resolution;

said step (d) generating an error value having a resolution corresponding to the first resolution.

\* \* \* \* \*